(12) United States Patent
Jung et al.

(10) Patent No.: US 9,790,738 B2
(45) Date of Patent: Oct. 17, 2017

(54) SUNSHADE DRIVING DEVICE HAVING A RETURNING FUNCTION OF A WHEEL DRIVING MEMBER

(71) Applicant: TERASOLAR CO.,LTD., Seoul (KR)

(72) Inventors: Taerok Jung, Seoul (KR); Jaeheun Jung, Seoul (KR)

( * ) Notice: Subject to any disclaimer, the term of this patent is extended or adjusted under 35 U.S.C. 154(b) by 41 days.

(21) Appl. No.: 14/653,875

(22) PCT Filed: Jan. 17, 2014

(86) PCT No.: PCT/KR2014/000537
§ 371 (c)(1),
(2) Date: Jun. 19, 2015

(87) PCT Pub. No.: WO2014/112837
PCT Pub. Date: Jul. 24, 2014

(65) Prior Publication Data
US 2015/0330144 A1 Nov. 19, 2015

(30) Foreign Application Priority Data

Jan. 18, 2013 (KR) .................. 10-2013-0005624
Jan. 18, 2013 (KR) .................. 10-2013-0005626

(51) Int. Cl.
*E06B 9/56* (2006.01)
*E06B 9/74* (2006.01)
(Continued)

(52) U.S. Cl.
CPC .............. *E06B 9/56* (2013.01); *E06B 9/42* (2013.01); *E06B 9/74* (2013.01); *E06B 9/90* (2013.01);
(Continued)

(58) Field of Classification Search
CPC ... F16H 37/00; E06B 9/68; E06B 9/70; E06B 9/78; E06B 9/80; E06B 2009/785
See application file for complete search history.

(56) References Cited

U.S. PATENT DOCUMENTS 4,417,185 A * 11/1983 Bullat ................. E06B 9/74
160/1
8,136,569 B2 * 3/2012 Bohlen ................ E06B 9/42
160/307

(Continued)

*Primary Examiner* — Ramya Burgess
*Assistant Examiner* — David Morris
(74) *Attorney, Agent, or Firm* — GWiPS

(57) ABSTRACT

The present invention relates to the sunshade driving device comprising that: a returning function of a manual driving module (410) is actuated by a ball chain or a rotating string; a rotating shaft (491) is attachable/detachable to the power drive unit or the rotating shaft stopping unit separated from a manual driving module; at least one pick-up member (452, 453) to directly drive the sunshade rotating shaft or driving the rotating shaft (491) by the manual drive module (410); a wheel driving member (417) having a manual pulley (417a) or a manual driving wheel (412b) being fitted the ball chain or rotating string; wherein the wheel drive member (417) will be engaged to the manual rotating wheel (412b) and the manual pulley (417a) for rotating together in one direction, and the wheel driving member (417) will disengaged the manual rotating wheel (412b) and the manual pulley (417a) for independently rotating each other in opposite direction activated by a bi-directional driving clutch (417b).

18 Claims, 28 Drawing Sheets

(51) Int. Cl.
*F16D 41/20* (2006.01)
*F16H 37/00* (2006.01)
*E06B 9/42* (2006.01)
*E06B 9/90* (2006.01)

(52) U.S. Cl.
CPC ...... *E06B 2009/905* (2013.01); *F16D 41/206* (2013.01); *F16H 37/00* (2013.01)

(56) References Cited

U.S. PATENT DOCUMENTS

| | | | | |
|---|---|---|---|---|
| 8,277,358 B2 * | 10/2012 | Gasparrini | ............... | E06B 9/68 475/331 |
| 2008/0121353 A1 * | 5/2008 | Detmer | ............... | E06B 9/72 160/266 |
| 2013/0190119 A1 * | 7/2013 | Barnes | ............... | E06B 9/42 474/144 |
| 2014/0224437 A1 * | 8/2014 | Colson | ............... | E06B 9/42 160/291 |

\* cited by examiner

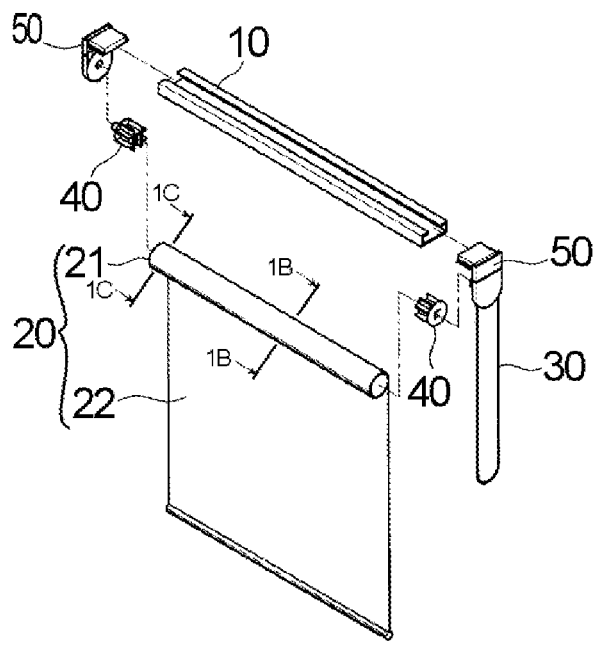
Fig. 1A
(Prior Art)
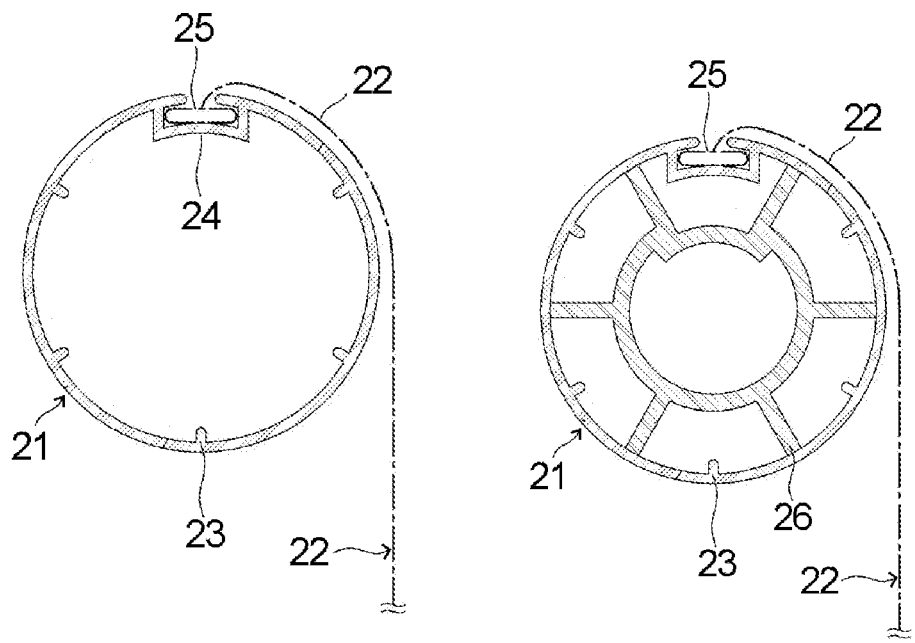
Fig. 1B
(Prior Art)
Fig. 1C
(Prior Art)

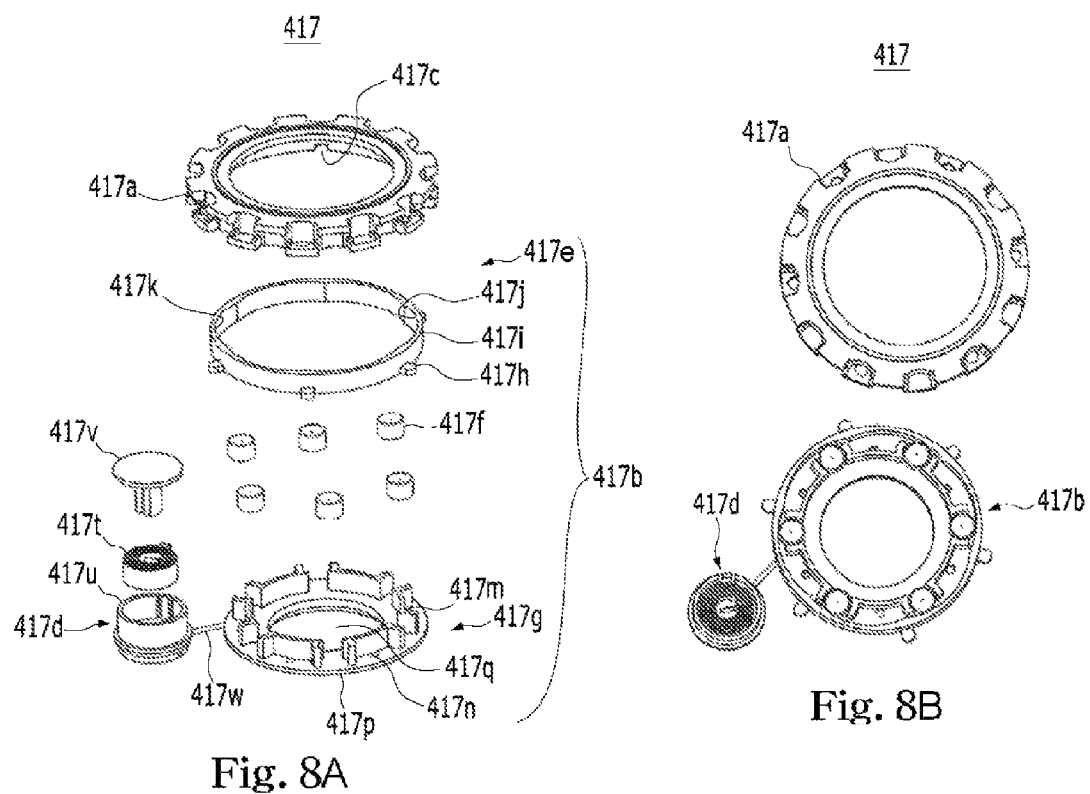

SUNSHADE DRIVING DEVICE HAVING A RETURNING FUNCTION OF A WHEEL DRIVING MEMBER

BACKGROUND OF THE INVENTION

1. Field of the Invention

The present invention relates to a sunshade driving device, such as a blind or a louver. Particularly, a wheel driving member of the sunshade driving device has a returning function to go back its original position, immediately after driving. Preferably, the sunshade driving device having the returning function of the wheel driving member driven by a manual/electric combined driving module. Additionally, a gear ratio of the planetary gear train is utilized for the returning function of the sunshade driving device.

The present invention also relates to a screen rotation rod of the roll/combination/triple blind (hereinafter refer to "rotating shaft"). The angle adjustment of the slat of the Venetian/Roman Shades/Honeycomb blind or the rotation rod for winding (refer to same as "rotating shaft"), and the rotating shaft of the vertical blind (refer to same as "rotating shaft") is manually driving a ball chain or a rotating string by hand-pulling (hereinafter both referring to "manual line") to securely transmit and easy to maintenance. The manual/electrical combined driving module is adapted for the returning function of the wheel driving member of the sunshade driving device.

2. Related Prior Art

Generally, a blind is installed on a window frame to selectively admit the sun-light through the window. According to the window structure, a length of the slats is arranged in the horizontal direction for operating up and down direction to selectively admit the sun-light, such as the venetian blind. The slats of the vertical blind are arranged in the vertical direction and operating the right and left directions to selectively admit the sun-light. The roll blind, which is winding the screen sheet, is moving up and down directions to selectively admit the sun-light, such as a roll type blind.

FIGS. 1A to 1D are an exploded perspective view and a cross-sectional view showing a typical roll blind of a kind of conventional roll type sunshade, FIG. 1E is an assembled cross-sectional view showing a typical roll blind of a kind of conventional roll type sunshade, and FIGS. 2A to 2D illustrate a typical Venetian Blind, which is a kind of the conventional slat type sunshade. That is, FIG. 1A is an exploded perspective view showing a typical roll blind of a kind of conventional roll type sunshade, FIG. 1B is a cross-sectional view according to the line 1B-1B in FIG. 1A, FIG. 1O is a cross-sectional view according to the line 10-10 in FIG. 1A, and FIG. 1D is an exploded perspective view of a roll sunshade input driving module. FIG. 2A is a perspective view showing a typical Venetian Blind, FIG. 2B is a plan view of FIG. 2A, FIG. 2C is a partial detail of FIG. 2B, and FIG. 2D is an exploded perspective view of a slat input driving module.

First of all, as shown in FIG. 1A, a head rail (10) of the roll blind is installed to the upper window frame, which is a kind of the conventional roll type sunshade; a roll screen (20) disposed on the lower side of the head rail (10), and an input driving module (40) for the roll sunshade is inserted to one end of the head rail (10), and supported the roll screen (20) rotatable; a pair of plugs (50) is for closing the opposite ends of the roll sunshade; as shown in FIG. 1B, the roll screen (20) has a screen sheet (22) including a fastening member (25); a protruding jaw is formed in the longitudinal direction of inner circumferential surface, a screen sheet fastener (24) is formed on an outer peripheral surface, a sunshade rotating shaft (23) made of a rod (tube) with a hollow inside is used as a rotation power shaft for winding the screen sheet as a roll (21); an input drive module (40) for sunshade driving is inserted to one end of the roll (21); the opposite ends of the rod are blocked by the plugs (50); as shown in FIG. 1A, an anti-deflection reinforcing member as the fastening member (25) is included to the inside of the sunshade rotating shaft (23) by considering the weight of the long width screen sheet (22); typically, the sunshade rotating shaft (23) is used for combination of the roll type sunshade drive-rotating shaft and the taking-up winding that is a very economical structure; the tube shaft is produced through the injection molding using an aluminum or plastic material, and the hollow shaft (tube) is used for lowering the manufacturing cost. A coupler (26) is for coupling the sunshade rotating shaft (23) in FIG. 1O and a pick-up member (44) (as shown in FIG. 1D) of the input drive module (40) in FIG. 1A.

Such a conventional roll blind, the user manually operates the roll sunshade input-driving module (40). Eventually, the roll (21) is operated by the ball chain (30) or rotating string (not shown). Alternatively, the electric motor (not shown) is rotating the sunshade rotating shaft (23) by using electric power. The screen sheet (22) of the roll screen (20) is selectively winding up or down for shading or admitting the sunlight.

In addition, as shown in FIG. 1D, the roll sunshade input driving module (40) (hereinafter "first conventional manual drive module") has a first conventional sunshade stopper (41) formed an engaging portion (45) and inserted to a first conventional spring member (42); a manual pulley operated by a ball chain (30) or rotating string (not shown), and the locking portion (45) of the first conventional spring member (42) push the spring body to the opening direction for releasing the friction force between the first conventional sunshade stopper (41) and the first conventional spring member (42) to drive the wheel driving tube shaft (47); the wheel driving tube shaft (47) is fitted to the outer peripheral surface of the first conventional sunshade stopper (41); the protruding jaw (48) is formed for fitting the outer peripheral surface to the screen sheet fastener (24) of the sunshade rotating shaft (23); the inner circumferential surface is coupled to the wheel driving unit (43) and the first conventional sunshade stopper (41); a first conventional pick-up member (44) formed a braking projection (not shown) activates that the spring body of the first conventional spring member (42) is pushed to be narrowed direction for increasing the friction force between the first conventional sunshade stopper (41) and the first conventional spring member (42) to brake; a user pulls the ball chain (30) or a rotating string (not shown) to rotate the wheel driving unit (43) (solid line arrow direction in FIG. 1E), a wheel driving tube shaft (47) of the wheel driving unit (43) pushes the lacking part (45) of the first conventional spring member (42) to the opening direction from the spring body of the first conventional spring member (42) to release the frictional force between the first conventional sunshade stopper (41) and the first conventional spring member (42); at the same time, the braking lock jaw (not shown) of the first conventional pick-up member (44) is pushed to rotate; then, the protruding jaw (48) formed on the outer circumferential surface screen sheet fastener (24) of the sunshade rotating shaft (23) rotates the roll (21) of the sunshade rotating shaft (23); when the user stops pulling the ball chain (30) or the rotating string (not shown), a rotational force is acted on the shaft (23)

according to the load of the screen sheet (22), eventually this rotational force rotates the first conventional pickup member (44); a brake locking jaw (not shown) of the first conventional pick-up member (44) pushes the spring body of the first conventional spring member (42) in the direction of narrowing (broken line arrow direction in FIG. 1E), the friction force increases between the first conventional sunshades stopper (41) and a the first conventional spring member (42) to stop the rotation of the sunshade rotating shaft (23).

Such a conventional roll blind, a great force for manual driving is exerted to the ball chain (30) or the rotating string (not shown) according to the weight of the screen sheet (22); the Republic of Korea Utility Model Registration No. 20-0434153 and 20-0424234 has disclosed a driving device that have a disadvantage because it requires great force to wind the screen sheet (22) on the roll (21); to solve the drawback, the Republic of Korea Patent No. 10-0669485 and the U.S. Pat. No. 6,685,592 disclosed the roll-blinds. However, those have a disadvantage that the rotational force is limited to enhance for the specific size of given roll (21) and the various weights of the blind fabrics; Also, the Republic of Korea utility model registration No. 20-0439469 disclosed the application of a planetary gear reducer; it requires a long length of the ball chain or the rotating string (not shown) due to the reduction ratio for raising the screen sheet; the operating time and the pulling numbers of the ball chain or the rotating string are increased. It is popularized to the public because of the less pulling force for winding the screen sheet.

This time, unlike the conventional roll-type sunshade, the venetian blind, which is a kind of the conventional slat type of sunshade device is discussed; as shown in FIGS. 2A to 2C; a head rail (10) installed on the upper window frame; a plurality of the slats (61) disposed lower side of the head rail (10); one set of slat module (6) consisted of a couple of slat lines through each of the slats; slat driving module (8); a slat sunshade input driving module (90) for driving the slat driving module (8); a slat sunshade cap; a slat type sunshade driving rotation shaft (9) is driven inserted with a plurality of slat driving module (8); the slat driving module (8) consisting of a pulling line (81) for lifting or lowering the plurality of the slats (61) and a slat mounting line control member (62) for adjusting the angle of the plurality of slats (61) by pulling or releasing the slat string and including a sliding spring (not shown).

Further, a slat sunshade input driving module (90) is inserted into one end of the head rail (10); the other end, the slat stopper for sunshade is fitted; as shown in FIGS. 2A and 2B, the weight of slat module (6) is considered for a set of elongated width; the slot mount string is fixed on a slat mounting line control member (62) being consisted of a couple of the sliding spring; the slot mount string balances the slots, simultaneously adjusts the angle of the slats; when the slots are moving up and down, the slots are considering the balance and the stability, at the same time; so that, a couple of the slat pulling strings (81) is arranged one-to-one corresponding to the slat mounting line control member (62); the slat-type sunshade driving shaft (9) installed at one end of the slat sunshade input driving module (90) is manually operated by rotating the ball chain (30) or the rotating string (not shown); eventually, an electric motor (not shown) is used to wind or unwind the slats (61) for selectively shielding or admitting the sunlight; at this moment, a ribbon can be used as the slat pulling strings (81); it is not shown in the figure, but in case of the ribbon used, other kind ribbon type slat drive module is used different from the slat driving module (8) as shown in FIG. 2B, (not shown).

Additionally as shown in FIG. 2D, the slat input driving module (90) for sunshade (hereinafter "second conventional manual driving module") provides a second conventional sunshade stopper (99) fixed to the case (90a) for inserting a second conventional spring member (98) formed an engaging portion (not shown); a manual pulley (91) having a sun gear at the center and the free gear (92); a wheel driving unit (43) consists of a planetary gear carrier (93) being protruded the spring drive member (94); the slat-type sunshade drive rotation shaft (9) is fitted a coupling sphere power (96), the planetary gear carrier (93) of the wheel driving unit (43) is combined with a second conventional pick-up member (97) forming a protruded braking lock jaw (95); when the user pulls the ball chain (30) or the rotating string (not shown), the wheel driving unit (43) is rotated by the pulling force, a planetary gear carrier (93) of the wheel driving unit (43) pushes the lacking part of the second conventional spring member (98) to the opening direction from the spring body of the second conventional spring member (98) to release the frictional force between the sunshade stopper (99) and the second conventional spring member (98), at the same time, the second conventional pick-up member (97) is rotated, then the slat type sunshade driving shaft (9) is rotated; when the user stops pulling the ball chain (30) or the rotating string (not shown), a rotational force is acted on the slat type sunshade driving shaft (9) according to the load of the slat, eventually this rotational force rotates the second conventional pickup member (97); a brake locking jaw (95) of the second conventional pick-up member (97) pushes the spring body of the second conventional spring member (98) in the direction to narrowing, the friction force increases to stop the rotation of the slat type sunshade driving shaft (9).

At this moment, the force applied to the ball chain or the rotating string (not shown) varies depending on the degree of winding or unwinding the slat that is well known fact to one skilled in the art; additionally, it will describe more in detail, when the slat is winding up being unrolled down to the bottom, the force is needed to release the frictional force between the second conventional sunshade stopper (99) and the second conventional spring member (98); in addition to the lifting force is needed to wind up the slat; the rotational force is needed to continuously rotate the driving wheel as long as the winded distance of the ball chain or the rotating string (not shown); when the slat, which is wound up to the top, is lowering to the bottom, the force is needed to release the frictional forces between the second conventional sunshade stopper (99) and the second conventional spring member (98) and the weight is negatively added to wind down the slat; eventually, it is the principle of rolling down the slat by its weight; Similarly, depending on the rotation of the drive wheel, the length of the ball chain or the rotating string must be supplied (not shown) to repeat the following take-up operation; the length of rotated ball chain or the rotating string varied depending on the diameter of the slat drive module (8), the diameter of driving wheel, the gear ratio; the pulling force is inversely proportional to the gear ratio as the gear ratio is larger; then, the required length of the rotated ball chain or the rotating string is increased; usually, the slat is heavier than the screen sheet, the driving wheel having a planetary gear train is applied; considering the pulling force and length of the adult, the length of the rotated ball chain or the rotating string is produced about 2 times longer than the driving distance of the slat module (6); in this case, the length of rotating distance for driving is exceeded the length of the rotated ball chain or the rotating string (not shown), but the required pulling force is reduced according to the gear ratio.

The conventional slat type sunshade device as well as the conventional roll type sunshades, the force applied to the manually operated ball chain (30) or the rotating string (not shown) is large according to the weight of one set of the slat module (6); due to the large pulling force needed, a planetary reduction gear is adopted; as the reduction ratio three is applied, the user manually wind the longer length of the ball chain or the rotating string (not shown); thus, the user consumes less energy to raise the sunshade device. however, it has a disadvantage to operate the longer tugging time and more tugging number; thus, there is a tendency to utilize an electric motor (not shown) instead of the manual operation.

Nevertheless, the manually operated conventional sunshade has the sunshade rotating shaft (23) and the slat-type sunshade driving rotation shaft (9); it has distinguish described that the static friction force of the spring is controlled for rotating the sunshade rotating shaft (not shown); thus, It has the common merits of the convenient control method and very economical operation; so, the utilization of the planetary gear train is widely popularized to reduce the energy consuming for the manual operation; the main reason is that the manual driving sunshade is durable, convenient and economical, so it is a noticeable fact.

Because of those advantages, the more electric motor operation (not shown) is employed to replace the manual operation; However, it is well known fact to one skilled in the art that each operation still has a merit and demerit; for an example, if an electric manual combined operation is not used to operate the sunshade; in case of the power failure, the electric motor is out of order, or the remote controller is misplaced, the user cannot operate the sunshade; it is very uncomfortable; further, it has a demerit that the motor consumes a lot of standby power, which cause to increase the power cost; thus, the electric/manual combined operation or the manual/motorizing combined sunshade is necessary.

Furthermore, it is not necessarily employing the electric driving system; among the manual driving system, one drives the sunshade by pulling a string or the sunshade is driven by rotating the rotation system coupled with the sunshade rotating shaft; it is necessary to be flexible for driving the sunshade with lighter pulling force by varying the gear ratio.

Further, as shown in FIG. 1E, in order to manually drive the sunshade to the both directions, continuously, it is necessary to have a ring shape ('U' shape as viewed only lower half) for the driving string (not shown); there is not a few accident happened the injury or death annually that a neck or other body parts of the infant is caught by the 'U' shaped driving string (not shown).

That is, as shown in FIG. 1A, the roll blind has a transmitting unit of the pulling force for winding/unwinding operations as the ball chain (30) or the rotating string (not shown); the loop has formed the same structure of the 'U' shape; the length of the loop matches to the unwounded length of the screen sheet, and hanged loosely in the longitudinal direction to the bottom; in case of the ball chain (30), a plurality of the identical sphere-shaped plastic balls (32) is arranged on a solid string (31) with constant intervals, and mounted firmly on the groove of the driving wheel for properly transmitting the pulling force by considering the lifting load of the screen sheet while it is winding; the loop is formed the 'U' shape by bonding the both ends of the string; the rotating string (not shown) is also formed the 'U' shape of the loop by bonding both ends of the string; it is applied to the most of roll blinds because of the robustness and inexpensive; However, the 'U' shaped loop having a long length is installed and hanged loosely to the lower position; so, it is easily accessible to the children for playing with the string, which is caused a fatal accident and issued the public problem; Therefor, many countries have issued a bill for standard safety regulation to avoid the accidents.

On the other hand, although it is not shown, the industry has attempted various improvements to solve the above-mentioned public problem of the 'U' shaped loop of the ball chain or the rotation line; a linear-type loop formed a stopper of the ball chain or the rotating string is used; and a spring return device is added to return by the reserve force; the ball chain or the rotating string is repeatedly supplied to drive instead of the 'U' shaped loop; a single line or the separated double line is exposed to the outside; the loop is easily separated when a predetermined force is loaded to the 'U' shaped loop of the ball chain or the rotation line; the ball chain or the rotating string is installed on the limited height to avoid the reach of the children's hand; the bottom end of the 'U' shaped loop of the ball chain or the rotating string is fixed, but not pinch the children's head; there are various attempts to solve the public problems raised by the 'U' shaped loop of the ball chain or the rotation line.

However, the industry's efforts are that a separating method of the loop when a predetermined force applies to the 'U' shaped loop of the ball chain or the rotating string, and the limited height of the loop installation to avoid reach of the children's hand; the industry's efforts are in fact makeshift.

On the other hand, in order to solve the above mentioned problems, the second conventional manual sunshade apparatus adopts the planetary reduction gear to reduce the applied force to the ball chain (30) and the rotating string (not shown) for manual operation by considering the weight of the slat and the hoisting load of the screen sheet; the prolonged length of the ball chain (30) or the rotating string (not shown) as much as the gear reduction ratio is manually wound; it needs less power to drive by the user, but there are drawbacks that the tugging number and operating time are increased; thus, there is a tendency to adopt the electric motor (not shown) instead of the manual operation; in addition, there is a trend to adopt the electric operation only in the new product of the sunshade for the sake of the children's safety; and it's dissemination is also increased.

Nevertheless, the conventional manual driving system is still needed to control the static frictional power; it is required the human power in the way of convenience and economic, except the children's safety; the conventional manual driving sunshade system has very economical and convenient way to control the traction of the spring, which is the lower cost and durable, so it is the economical point of fact.

The conventional electric driving sunshade system as well as the manual driving sunshade system cannot be recycled the conventional manual driving sunshade; It is well known fact to one skilled in the art that the technology has recognized to simply replace the conventional manual driving system; the main reason is that the structure of the conventional manual driving sunshade system cannot simply and easily remove or mount the motor, while it is maintaining the function; because of these reason, the user cannot operate the sunshade system until the motor repair; it is very uncomfortable, and caused the customer large complaints; it is a big troublesome to those of ordinary skill in the art; it is impossible to operate the sunshade, even if the broken motor is removed; the sunshade can operate without burdensome of the reassembly the conventional manual sunshade drive unit; it is necessary to simply operate the sunshade driving system manually, even if the motor is separated from the driving system; when the manual driving sunshade is converted to the electric driving sunshade, the motor is simply mounted without difficulty; most of the time, it is not possible to simply add the motor or impossible to both manually removed from the conventional shade driving device, most made of the plastic, is used, after using it, most We needed to be improved in terms of cost and environmental issues, so throw away after a conventional drive system manually removed from the sunshades are using; most of the conventional sunshade manual driving device produced with the plastic is removed from the used eaves and discarded; so it is necessary to improve in terms of cost and environmental issues.

Furthermore, it would not be necessarily the electric driving system; among the manual driving system, the sunshade system is driven by pulling string or driven the rotating body coupled to the sunshade rotating shaft, or driven the sunshade system with the lighter pulling force by varying the gear ratio.

On the other hand, a planetary gear as shown in FIG. 3, generally a planetary gear train (Planetary Gear Trains or Epicyclical Gear Trains, referring to 100 of FIG. 3), which is consisted of a sun gear (Sun Gear, 130), a ring gear (110), and a free gear (92), and arranged concentrically; in the case of the planetary gear train having same transmission ratio, it has the compact volume, concentric input and output, and the high efficiency of the power transmission comparing with the other principle of the gear train; because of the high efficiency, it can be applied where requires the small, compact and lightweight, such as an aircraft, automobile, office equipment and machine tools, which are widely used; the structure is consisted of a ring gear (110) as an internal contact gear at outer side, the internal gear meshed with the free gear (92), those are supported by the planetary gear carrier (93), the sun gear (130) meshed with the free gear (92) from the inner side arranged on the concentric; The transmitting load is dispersed due to using a plurality of the free gears (92); so, it can be reduced the overall size; if the free gear (92) is arranged symmetry, the radial load of the free gears (92) is offset each other; thus, it has a merit to consider the axial load only when the bearing and frame are designed; it is easy to process, small contacting linear velocity, the friction loss reduced due to the dispersion of the transmitting load, the noise diminished, and the higher efficiency.

For this reason, the application of the planetary gears is versatile; for example, it is applied to the reduction motor, accelerating gearbox, which is attached to the various types of power driving unit to drive the output shaft that is a well-known fact; Referring to a more specific operation relationship, the ring gear (110) is stopped and the planetary gear carrier (93), the free gear (92) and the sun gear (130), which of all are freely rotatable state, the sun gear (130) is driven by the input rotating shaft (not shown); when those free gear (92) are rotated, the planetary gear carrier member (93) which is supporting the free gears reduced the rotation speed, then, the output rotating shaft coupled to the planetary gear carrier (93) is rotatable state; it is possible that the input rotating shaft drives the planetary gear carrier (93) for increasing speed.

Further, at this time, the planetary gear carrier (93) is fixed, the ring gear (110), the free gear (92) and the sun gear (130), all of them are in free rotatable state, and rotating the sun gear (130) also by using the input rotating shaft (not shown), the free gear (92) are rotated, the planetary gear carrier (93) being supported those members is fixed, then the ring gear (110) will be rotated; another output rotating shaft (not shown) coupled to the ring gear (110) can be reduced the rotational speed; the ring gear (110), the free gear (92), the planetary gear carrier (93) all of them are freely rotatable state, and the sun gear (130) is fixed, and the planetary gear carrier (93) is driven by the input rotating shaft (not shown), the speed of the ring gear (110) can be reduced.

additionally, the planetary gear carrier (93) is fixed, the ring gear (110), a free gear (92), the sun gear (130), all of them are freely rotatable state, the input rotating shaft (not shown) is driving the ring gear (110); those gear meshed with the free gears (92), the planetary gear carrier (93), which is supporting those gears is fixed; thereby, the sun gear (130) accelerates rotational speed; the sun gear (130) is fixed, then the input rotating shaft (not shown) drives the ring gear (110), it is possible to accelerate the rotational speed of the planetary gear carrier (93).

Further, the free gear (92) is in fixed a state, the sun gear (130) and the ring gear (110) are driven by the input rotating shaft at same time, then it is possible to rotate the planetary gear carrier (93): additionally, it is possible to arrange the gear train of various combinations with high efficiency. It is well known fact to one skilled in the art; it has applied to drive the sunshade.

However, in the conventional sunshade driving system being used the planetary gear train utilizes only the limited advantage of the reduction ratio and the transmitting load; it is not utilized the members of the planetary gear train to be selectively driven in the fixing state or the free rotating state through the input rotating shaft or the output rotating shaft.

SUMMARY OF THE INVENTION

Detailed Description of the Invention

Technical Subject

The present invention is invented to solve the aforementioned problems in view of the various problems of the prior art as described above; the purpose of the present invention is to drive each of the roll type sunshade and the slat type sunshade; a return function immediately after operating the drive wheel as well as the driving member; the manual operating string having a straight line instead of the 'U' shape; or if the 'U' shape is used, the bottom line can be easily cut by applying a small force or to shorten the string not to reach the children's hand; the Child Safety for responding capability of the accident; and the manual/electric combined driving sunshade devices.

Furthermore, the present invention is invented to solve the above mentioned problems in view of the various problems of the prior art; The object of the present invention is to provide the manual/electric combined sunshade driving system.

Particularly, the purpose of the present invention is to utilize the characteristics of the planetary gear train members being selectively coupled to input rotating shaft and output rotating shaft for using the manual/automatic combined system.

Furthermore, even if the sunshade driving system is not adopted an electric driving, it can be operated by pulling a string of the manually driving system; or rotate the sunshade rotating shaft coupled to the rotating member to drive the sunshade; or by varying the gear ratio, lighten the driving load of the sunshade system, flexibly.

Technical Solution

A sunshade driving device having a returning function of a driving wheel unit consisted of either one of a manual pulley (417a) or a manual driving wheel (412b) comprising: a manual driving module (410) actuated by a ball chain or a rotating string; a set of pick-up members (451, 452) driven by the manual driving module for directly driving a sunshade rotating shaft (23): a wheel driving member (417) having a driving wheel element for mounting the ball chain or the rotating string; and a bi-directional driving clutch (417b) for transmitting or releasing a rotational force of the driving wheel member in any one of both directions; when the bi-directional driving clutch (417b) properly drives the driving wheel member in either one of clockwise or counter-clockwise directions, the bi-directional driving clutch (417b) is configured to bind the driving wheel member and the manual driving module (410) to rotate together with the set of pick-up members (451, 452); and immediately after rotation, when the bi-directional driving clutch (417b) allows to reverse-rotate the driving wheel member in the opposite direction, the bi-directional driving clutch (417b) is configured to unbind the driving wheel member and the manual driving module (410) to rotate independently from the set of pick-up members (451, 452); the bi-directional driving clutch (417b) further comprising: a bi-directional driver (417e) being coupled to the driving wheel member and having a body (417i) in an inner circumferential surface forms a plurality of bi-directional moving grooves arranged with a constant interval, and each of the bi-directional moving grooves forms an arc-shape having a small diameter (417j) and a large diameter (417k); a retainer (417g) having a disk-shaped body, a plurality of unit elastic member holders (417m) arranged along with its periphery with a constant interval on a plane of the disk-shaped body, and a plurality of the roller members (417f) inserted rotatable between the bi-directional moving grooves of the bi-directional driver (417e) and the unit elastic member holders (417m) of the retainer (417g), respectively.

Preferably, the bi-directional driving clutch (417b) further comprising: a reverse rotating unit (417d) to reverse a retainer (417g) of the bi-directional driving clutch (417b), when an operator releases the ball chain or the rotating string and stops the manual rotating operation.

Preferably, the bi-directional driving clutch (417b) further comprising: a bi-directional driver (417e) being coupled to the driving wheel member and having a body (417i) in an inner circumferential surface forms a plurality of bi-directional moving grooves arranged with a constant interval, and each of the bi-directional moving grooves forms an arc-shape having a small diameter (417j) and a large diameter (417k); a retainer (417g) having a disk-shaped body, a plurality of unit elastic member holders (417m) arranged along with its periphery with a constant interval on a plane of the disk-shaped body, and a plurality of the roller members (417f) inserted rotatable between the bi-directional moving grooves of the bi-directional driver (417c) and the unit elastic member holders (417m) of the retainer (417g), respectively.

Preferably, the reverse rotating unit (417d) further comprising: a spring (417t), a fixing pin 417v) fixedly coupled to a fixing end (416d) of a cap member (416), a spring bobbin (417u) formed a cylindrical shape, which has a containing groove with a preset depth for receiving a spring (417t) on one end of inner circumferential surface and a rope coupler on the opposite end of an outer peripheral surface, and a returning rope (417w), of which the one end is coupled to the rope coupler of the spring bobbin (417u); and of which the opposite end is coupled to the rope coupler (417n) of the retainer (417g) of the bi-directional driving clutch (417b).

Preferably, the plurality of the roller members (417f) is selected from either one of spherical balls or cylindrical rollers with a predetermined diameter and length.

Further preferably, either one of unit elastic members or an entire elastic member further comprising: each of the unit elastic members sets each of the roller members (417f) on a neutral position, that is, the position of the large diameter (417k) of the bi-directional moving grooves of the bi-directional driver (417e) by pushing each of the roller members (417f) to the right and left, when the retainer (417g) stops rotating; and the entire elastic member sets all of the roller members (417f) on the neutral position, at once, by reverse-rotating a preset angle or continuously, when the retainer (417g) stops rotating.

Preferably, the manual pulley (417a) is separable from a body (417i) of the bi-directional driving clutch (417b), further comprising: a coupling end (417c) of the manual pulley (417a) and a fitting protrusion (417h) coupled to the body (417i) being engaged each other.

Preferably, the manual driving module (410) is further comprising: a rotating shaft (491) being attachable/detachable to a shaft rotation stopping unit or a power driving unit separated from the manual driving module; a planetary gear train (430) consisted of three gear elements of a ring gear (432), a sun gear (434) and a planetary gear carrier (431), whose a first gear element is coupled to an output of the manual driving module (410), and whose a second gear element is coupled to the rotating shaft (491), and a second pick-up member (452) for driving the sunshade rotating shaft (23) and for coupling to the third gear element of the three gear elements.

Preferably, the planetary gear train (430) consisted of: a first planetary gear carrier (431a), the ring gear (432), a free gear, a second planetary gear carrier (431b) being connected to the first planetary gear carrier (431a) and the shaft (433s) of the free gear, and the sun gear (434) having a predetermined length and forming a gear teeth with a predetermined width on an end side; and a third pick-up member (453) being shaft-coupled to the second planetary gear carrier (431b) for driving the sunshade rotating shaft along with the second pick-up member (452).

Preferably, the manual driving module (410) is further comprising: an output of the manual driving module (410) is shaft-coupled to the planetary gear carrier; the rotating shaft (491) is shaft-coupled to the sun gear (434); and the ring gear (432) is shaft-coupled to the second pick-up member (452).

Preferably, the manual driving module (410) is further comprising: a stopping unit for stopping the rotating shaft (491), wherein a gear ratio of the first gear element and the third gear element of the three gear elements is 1:n (n>1).

Preferably, the reverse rotating unit (417d) is further including: an electric driving module (490) for driving the rotating shaft (491), wherein the sunshade rotating shaft is driven by the manual driving module through the planetary gear train, when the electric driving module is not in operating state; and the sunshade rotating shaft is driven by the electric driving module (490) through the planetary gear train when the electric driving module (490) is in operating state.

Preferably, the manual driving module (410) further comprised of: a manual stopper (411) firmly fixed to a fixing bracket, a wrap spring drive member (412) having a lock releasing protrusion (412a), which is inserted into a manual driver (414) having an inner protrusion (414c); wherein, on both end portions of the spring member (411b), locking portions (411a) are formed and the spring member (411b) is wrapped around the outer peripheral surface of the manual stopper (411); the lock releasing protrusions (412a) releases the frictional force of the spring member (411b) by pushing the locking portion (411a) in the direction of opening the body of the spring member, when the ball chain or the rotating string is pulled, the inner protrusion (414c) increases the frictional force of the spring member (411b) by pushing the locking portion (411a) of the spring member (411b) composed the manual stopper (411) in the direction to narrow the body of the spring member, when the manual driver (414) is rotating by the weight of the sunshade, the inner protrusion (414c) is pushed by rotating with the lock releasing protrusion (412a), when the wrap spring drive member (412) is rotating; and the manual driving module (410) is inserted freely rotatable to the inside of a first pick-up member (451) coupled to the sunshade rotating shaft.

Preferably, the manual stopper (411) having a hollow (411c) with a predetermined diameter, further comprising: the hollow (411c) is formed as the inner circumferential surface of the manual stopper (411), and a protrusion of a sunshade fixing bracket is inserted through the hollow (411c) and therefore the manual stopper (411) is firmly coupled to the sunshade fixing bracket, and the manual stopper (411) is inserted into the wrap spring drive member (412).

Preferably, the manual driving module (410) is further comprising: a piezoelectric motor is used as an electric driving module (490) for driving the rotating shaft (491); a shaft of the sun gear (434) is coupled to the rotating shaft (491), and a second pick-up member (452) is coupled to a shaft of the ring gear (432).

According to the other aspect of present invention of the sunshade driving device having a returning function of a driving wheel member, comprising: a manual driving module (410) actuated by a ball chain or a rotation string, a pick-up member (500) for driving a sunshade rotating shaft by the manual driving module (410), a wheel driving member (700) having a manual pulley (700a) for mounting the ball chain or the rotating string, and a bi-directional switching clutch member (710) for transmitting or releasing a rotational force of the manual pulley in any one of both directions, wherein, the manual driving module (410) is started to drive by the rotation of the manual pulley (700a); the rotation of the manual driving module (410) is stopped by the weight of the sunshade, when the manual pulley (700a) stops driving; and when the bi-directional switching clutch member (710) properly drives the manual pulley in any one of both directions, the bi-directional switching clutch member (710) is configured to bind the manual pulley and the manual driving module (410) to rotate together with the pick-up member (500); and immediately after the rotation, when the bi-directional switching clutch member (710) allows to reverse-rotate the manual pulley in the opposite direction, the bi-directional switching clutch member (710) is configured to unbind the manual pulley and the manually driving module (410) to rotate independently from the pick-up member (500).

Preferably, the bi-directional switching clutch member (710) further comprising: a reverse rotating unit (714) for reverse-rotating a retainer (712) of the bi-directional switching clutch member (710), when an operator releases the ball chain or the rotating string and stops the manual rotating operation.

Preferably, the bi-directional switching clutch member (710) further comprising: a bi-directional driver (711) being coupled to the manual pulley (700a) and having a body in an inner circumferential surface where a plurality of bi-directional moving grooves arranged with a constant interval, and each of the bi-directional moving grooves formed an arc-shape having a small diameter (711a) and a large diameter (711b); a retainer (712) having an engaging part (712a) coupled to one end of the elastic member, and a plurality of the unit elastic member holders (712b) arranged with a constant interval; and a plurality of the roller members (713) inserted rotatable between the bi-directional moving grooves of the bi-directional driver (711) and the unit elastic member holders (712b) of the retainer (712), respectively.

Preferably, the engaging part (712c) is spaced apart from a position of the unit elastic member holder (712b) corresponding to a main body of the retainer (712), and the engaging part (712c) is coupled to a guide member (712d) of the main body of the retainer (712).

Preferably, the sunshade driving device further comprises an electric driving module (600), wherein the manual driving module (410) is a manual/electric combined driving module (400).

Preferably, the guide member (712d) is further comprising that: a hollow is formed at the center of the guide member (712d) wherein the rotational shaft (610) of the electric driving module (600) is passed through the inside of the hollow.

Preferably, the manual driving module (410) further comprised of: a manual stopper (411) firmly fixed to a fixing bracket, a first wrap spring driving part (421) of a wrap spring drive module (420) having a locking release protrusion (421c), and the pick-up member (500) having an inner locking protrusion (500a); wherein, on both end portions of the spring member (411b), locking portions (411a) are formed and the spring member (411b) is wrapped around the outer peripheral surface of the manual stopper (411); the lock releasing protrusions (421c) releases the frictional force of the spring member (411b) by pushing the locking portion (411a) in the direction of opening the body of the spring member, when the ball chain or the rotating string is pulled, the inner locking protrusion (500a) increases a frictional force of the spring member (411b) by pushing the locking portion (411a) of the spring member (411b) composed the manual stopper (411) in the direction to narrow the body of the spring member, when the pick-up member (500) is rotating by the weight of the sunshade, and the inner locking protrusion (500a) is pushed by and rotated with the locking release protrusion (421c), when the first wrap spring driving part (421) is rotated; and the manual driving module (410) is inserted freely rotatable to inside of the pick-up member (500) coupled to the sunshade rotating shaft.

Preferably, the bi-directional switching clutch member (710) further comprising: a bi-directional driver (711) is formed on an electric coupling member (620) consisted of an electric driving module (600), and a hollow shaft connecting the wheel driving member (700) of the manual driver (750) and an electric coupling member (620) is passed through a guiding member (712d) of the bidirectional switching clutch member (710).

Preferably, the reverse rotating unit (714) further comprising: a torsional spring (714b), a fixing unit (714d) for fixing one end of the torsional spring (714b) to a fixing rod (714*a*), and a transmitting unit for transmitting the torsional force to the other end of the torsional spring (714*b*) when the manual driving module (410) is operated.

Preferably, the plurality of the roller members (713) is selected from either one of spherical balls or cylindrical rollers with a predetermined diameter and length.

Preferably, either one of unit elastic members or an entire elastic member is consisted of: each of the unit elastic members sets each of the roller members (713) on a neutral position, that is, the position of the large diameter (711*b*) of the bi-directional moving groove of the bi-directional driver (711) by pushing each of the roller members (417*f*) to the right and left, when the retainer (712) stops rotating, and the entire elastic member sets all of the roller members (713) on the neutral position, at once, by reverse-rotating a preset angle or continuously, when the retainer (712) stops rotating.

Preferably, the wrap spring drive module (420) further comprises: the first wrap spring driving part (421) for directly driving the spring member (411*b*) of the manual driving module (400*a*) and a second wrap spring drive part (422) connected to the bi-directional switching clutch member (710), and a driving connector (423) for connecting the first wrap spring driving part (421) and the second wrap spring drive part (422), wherein a hollow having a predetermined diameter is formed by the inner peripheral surface of the manual stopper (410), which the driving connector (423) is passing through, and the manual stopper (411) is to be inserted into the first wrap spring driving part (421).

Preferably, a driving recessed protrusion (500*a*) is formed on the outer circumference of the pick-up member (500) for driving the sunshade driving shaft.

Preferably, the electric driving module (600) further comprises: a piezoelectric motor is used as a power source of the electric driving module (600).

Effects of the Invention

According to the present invention, since the bottom of the driving string of the sunshade driving device is the single straight line or easily separated. Thus, it is possible to prevent the children's accident of hurting the neck or body parts, which is caused to a serious injury or even death by hanging by the driving string.

Furthermore, the sunshade driving device according to the invention has merits that it is compact, easy to manufacture, and the low producing cost.

In addition, among the manual driving system, pulling a line drive or a sunshade, or by rotating the entire time that the axis combined with the axis of rotation drives the sunshade or canopy, or by changing the gear ratio that gives the flexibility to be slightly different than the sunshade drive Shades drive unit is possible Additionally, the manual and electric combined system can be used with high efficiency. It is compact, so easy to install at narrow space.

Particularly, the motors is easy to mount or remove for effectively repair when it is out of order.

Additionally, it has another advantage that the length of manual string can be shortened efficiently

BRIEF DESCRIPTION OF THE DRAWINGS

FIG. 1A is an exploded perspective view and a roll cross-sectional view showing a typical roll blind of a kind of conventional roll type sunshade.

FIG. 1B is a cross-sectional view according to the line 1B-1B of FIG. 1A.

FIG. 8A is a partial exploded perspective view of a manual driving module, which is one component of the sunshade driving device having a returning function of the wheel driving member according to the first embodiment of the present invention.

FIG. 8B is a plan view of a bi-directional driver and a bi-directional driver clutch of a manual driving module.

FIG. 10 is an exploded perspective view of a planetary gear train, which is one component of the manual driving module having a returning function of the wheel driving member of the sunshade driving device according to the first embodiment of the present invention.

DETAILED DESCRIPTION OF THE PREFERRED EMBODIMENTS

Hereinafter, the configuration and operation of the preferred embodiment of the present invention will be described in great detail with reference to the accompanying drawings.

However, the purpose of accompanied drawings is easily described the present invention. The scope of the present invention is not limited to the scope of the accompanied drawings. It will be appreciated those who skilled in the art.

For reference, one of the present applicant files the "sunshade driving device by using the planetary gear train." It has disclosed the application of the principle of the planetary gear train for operating the sunshade driving system. It can be referred to hereinafter.

(A Sunshade Driving Device Used the Planetary Gear Train)

Figure 4A:
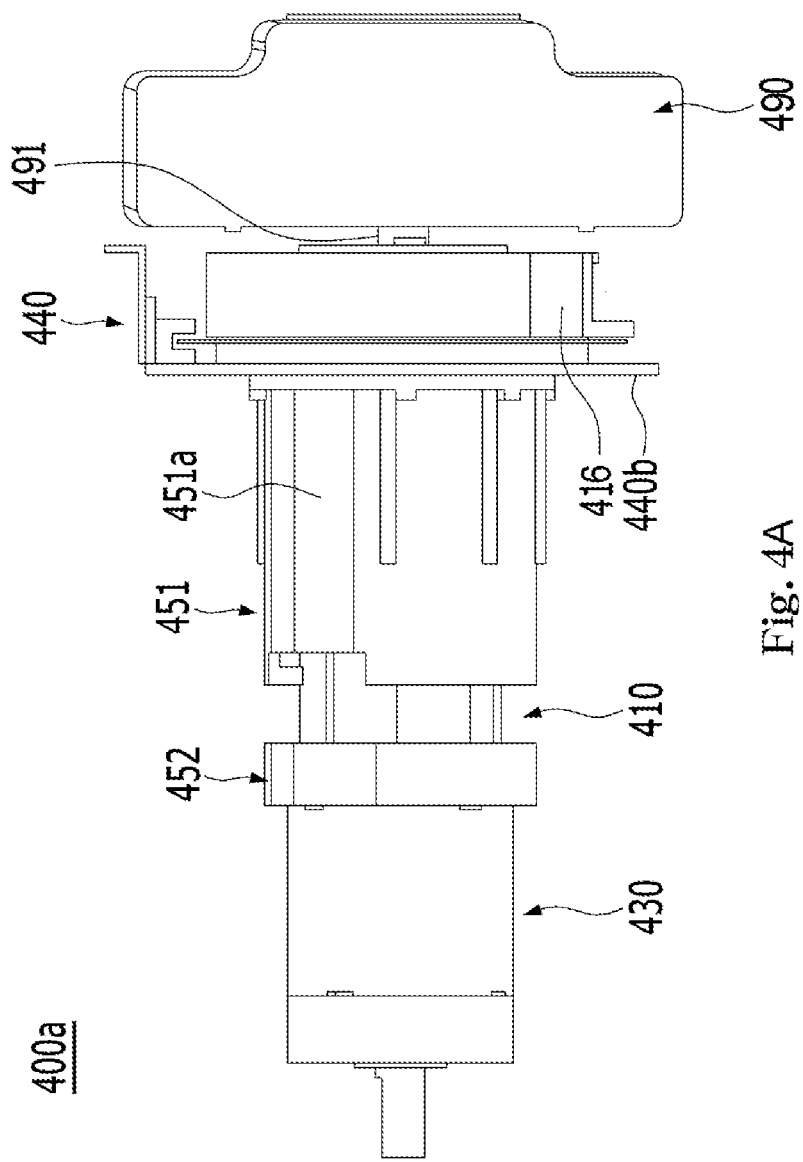
FIG. 4A is a perspective view of a sunshade driving device adopting the planetary gear train according to the present invention.
Figure 4B:
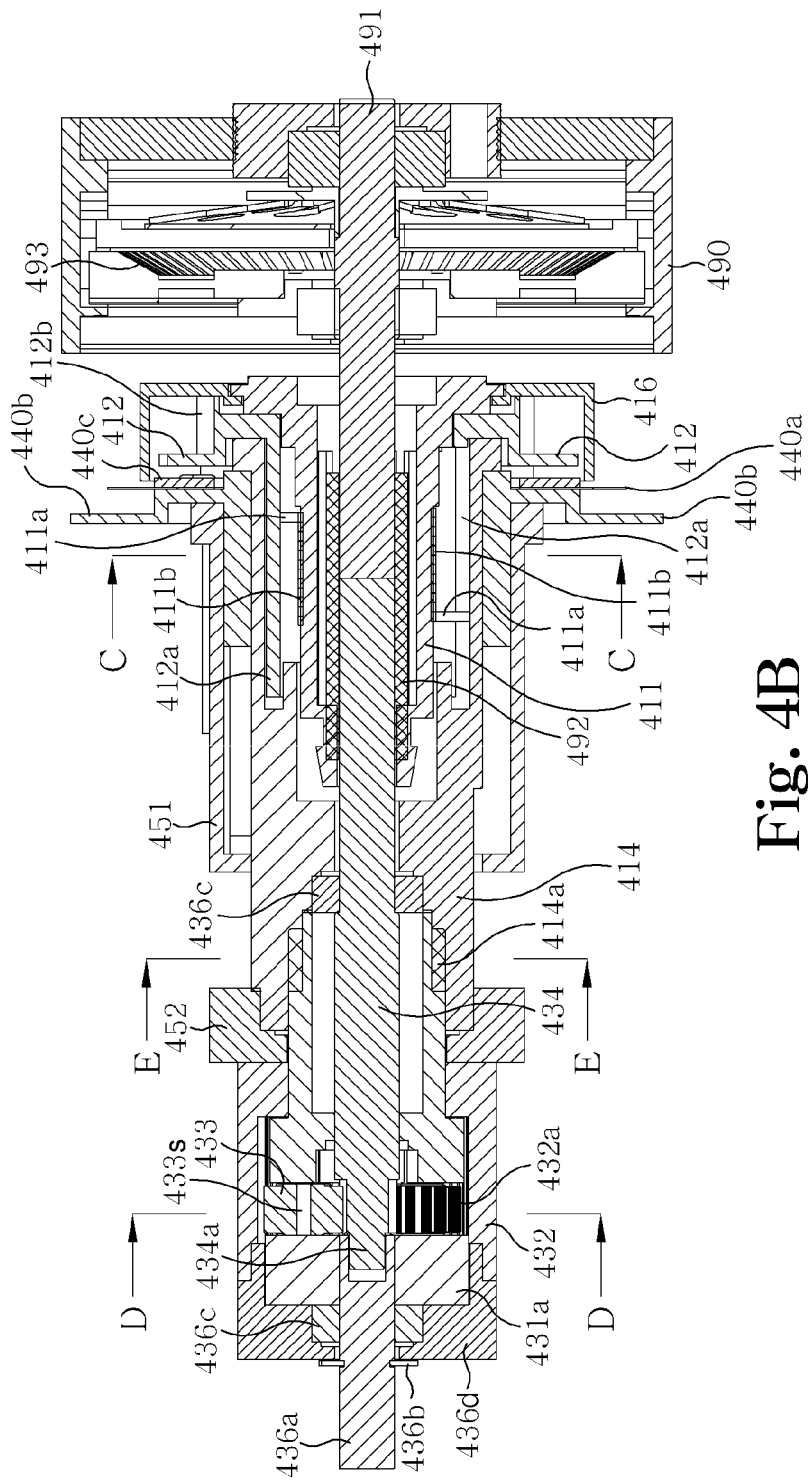
FIG. 4B is a cross-sectional view of a sunshade driving device utilizing the planetary gear train according to the present invention.
Figure 4C:
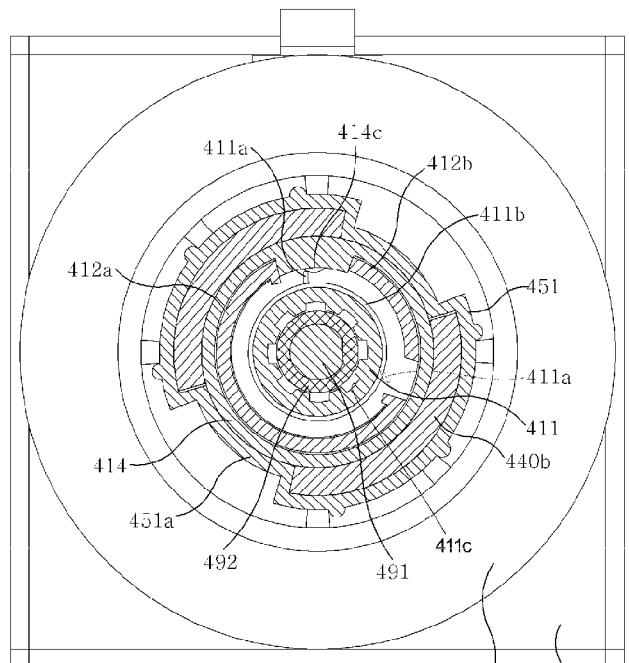
FIG. 4C, FIG. 4D and FIG. 4E are the cross-sectional view of the cutting lines C-C, D-D and E-E in FIG. 4B, respectively.
Figure 4D:
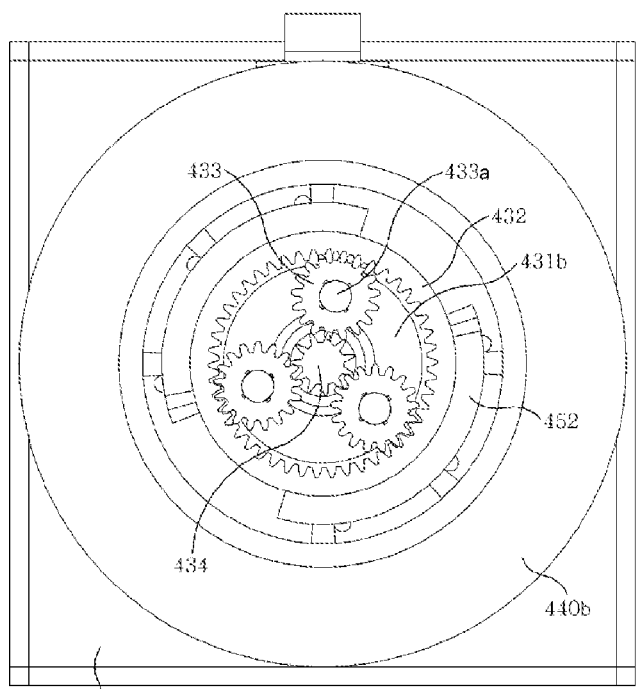
Figure 4E:
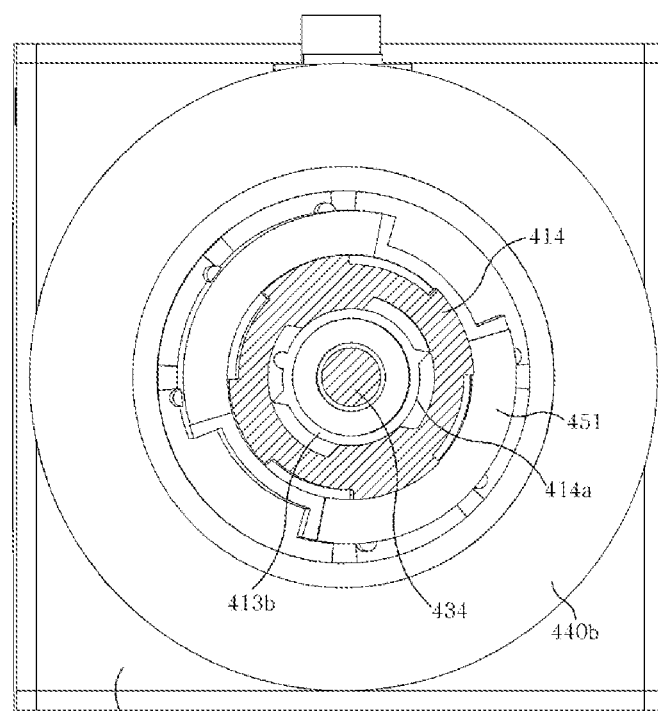

First of all, it will be described the sunshade driving system using a planetary gear train with reference to FIG. 4A to FIG. 6 for the objectives of the present invention. FIG. 4A is a perspective view of a sunshade driving device using the planetary gear train according to the present invention, FIG. 4B is a cross-sectional view of a sunshade driving device using the planetary gear train according to the present invention, FIG. 4C, FIG. 4D and FIG. 4E are the cross-sectional view of the cutting lines C-C, D-D and E-E in FIG. 4B, respectively, FIG. 5 is an exploded perspective view of a sunshade driving device using the planetary gear train according to the present invention, FIG. 6 is an exploded perspective view of a manual driving module, which is a component of the sunshade driving device using the planetary gear train according to the present invention.

Figure 5:
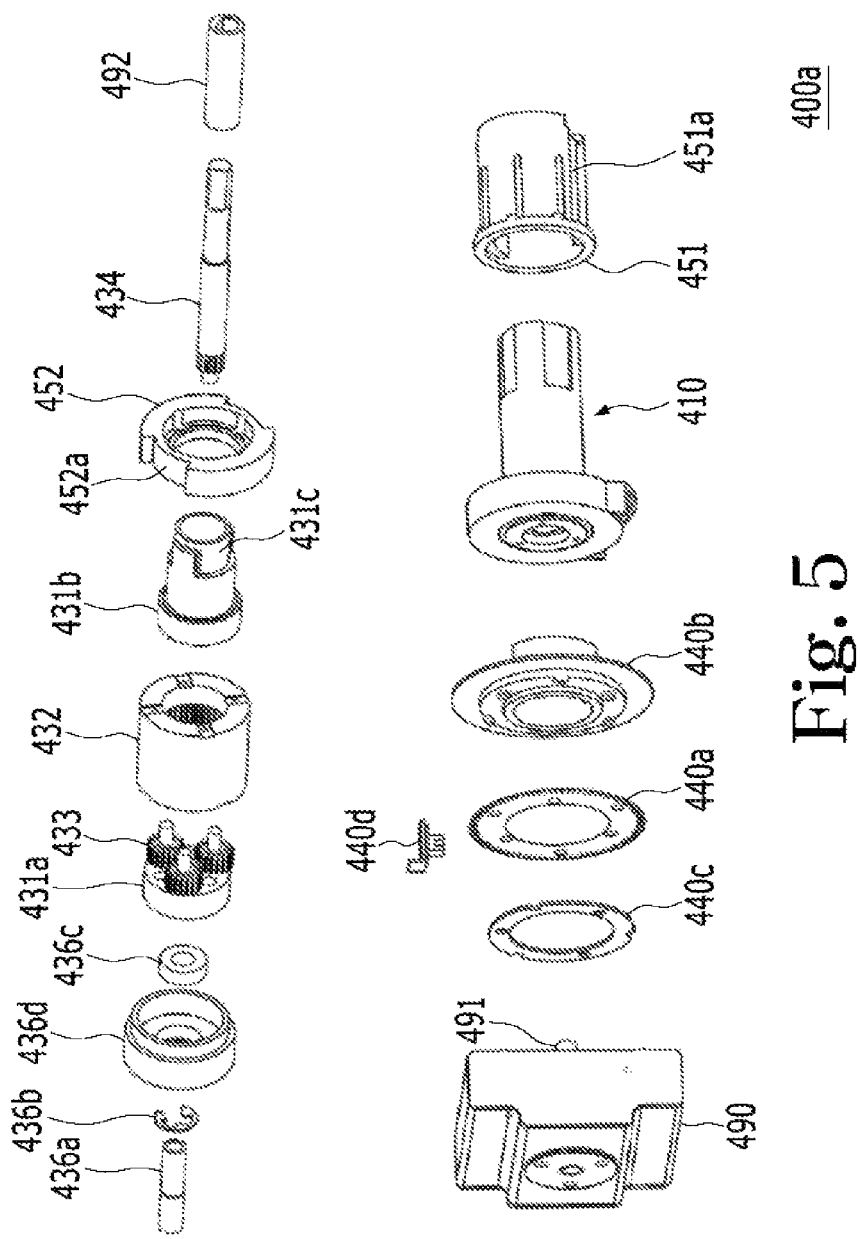
FIG. 5 is an exploded perspective view of a sunshade driving device using the planetary gear train according to the present invention.
Figure 6:
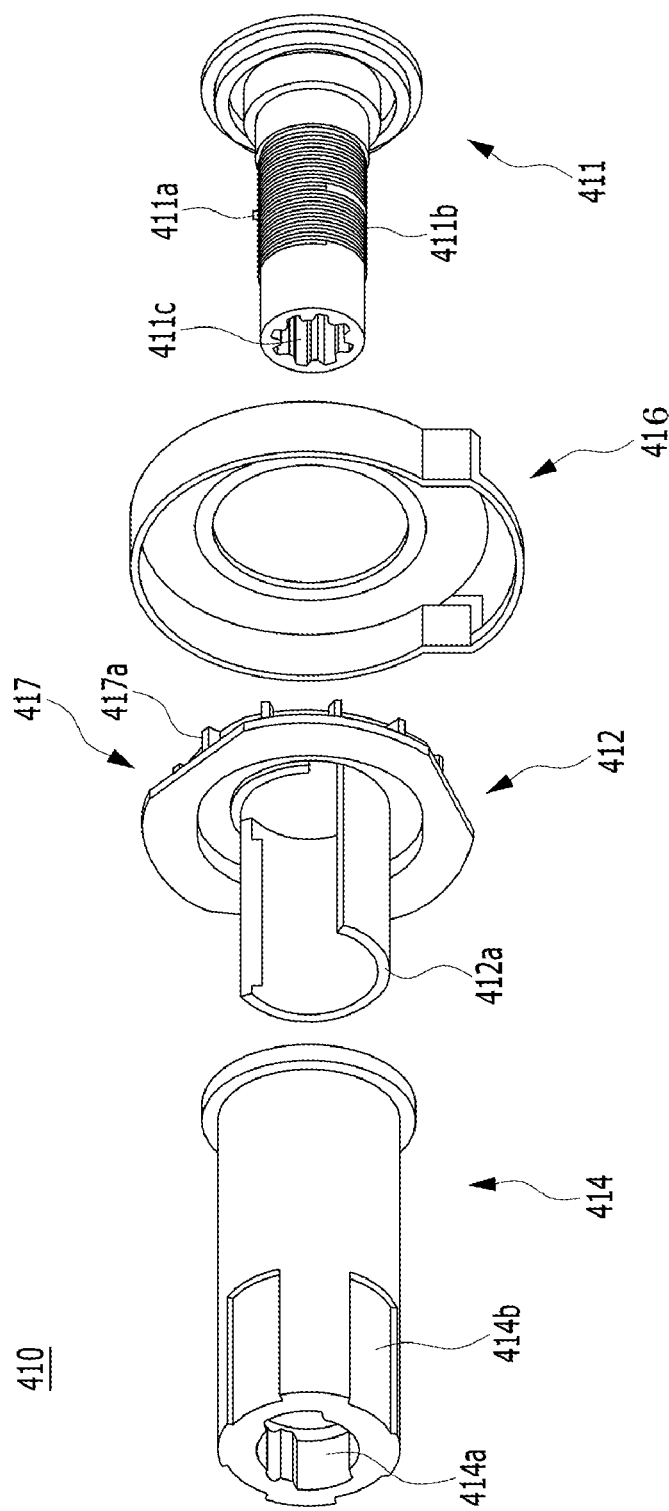
FIG. 6 is an exploded perspective view of a manual driving module, which is a component of the sunshade driving device using the planetary gear train according to the present invention.

The sunshade driving device utilizing the planetary gear train of the present invention (400a) is shown in FIG. 4A, FIG. 4B, FIG. 4C, FIG. 4D and FIG. 4E with FIG. 5 and FIG. 6, a planetary gear train (430) is consisted of the ring gear (432), the sun gear (434) and the planetary gear carrier (431); and operated by a ball chain (not shown) or a rotating string (not shown); the ring gear (432) of the planetary gear train (430), the sun gear (434) and the planetary gear carrier (431), any one selected of them is coupled to the manual driving module (410) to drive or stop; a second pick-up member (452) has a recessed projection (452a) coupled and fixed to the output side of the planetary gear train (430) for driving the sunshade rotating shaft (not shown); a first pick-up member (451) is driven by rotation of the sunshade rotating shaft (not shown), formed a driven recessed protrusion (451a) on the outer circumferential surface for inserting to the outer peripheral surface of the manual driving module (410), freely rotated with respect to the manual driving module (410) and coupled to the sunshade rotating shaft (not shown); an electric driving module (490) having the stopping unit (not shown) and the rotating shaft (491) is driving or stopping the selected member of the planetary gear train (430) of the ring gear (432), the sun gear (434) and the planetary gear carrier (431), which is not coupled to the manual driving module (410); a ball chain (not shown) or a rotating string (not shown) drives the sunshade manually through the manual driving module (410), regardless of the driving or stopping state of the electric driving module (490), the sunshade is freely operated manually, at the same time contrary, when the electric driving module (490) is driving the sunshade, regardless of the driving or stopping state of the sunshade operation through the manual driving module (410), the sunshade is freely operated.

The electric driving module (490) includes separately a stopping unit or a motor having a self-braking structure, such as a piezoelectric motor, and the first pick-up member (451) for measuring the rotational speed and position of the sunshade rotating shaft (not shown) coupled to the encoder device (440) (describe later); herein, the motor is provided with a piezoelectric motor, the rotating shaft (491) includes a hollow shaft connector (492) having a predetermined length and diameter being formed an inner protrusion, further including the shaft connector (492), the rotating shaft (491) is inserted and coupled to one end of the shaft connector (492), and other end is coupled to the selected member of the planetary gear train (430) of the ring gear (432), the sun gear (434) and the planetary gear carrier (431), which is left over; one end of the sun gear (434) (describe later) is inserted and coupled to the shaft of the piezoelectric motor having the structure of self-locking being bonded the rotor and the stator, strongly and fixedly by preloading in the power-off state, the piezoelectric motor has provided a self-braking function when the motor is not in operating state. As a resulting of start-up or shutdown, the planetary gear train (430) coupled to the rotating shaft (491) of the piezoelectric motor is driving or stopping the selected member of the planetary gear train (430) of the ring gear (432), the sun gear (434) and the planetary gear carrier (431), which is well kwon fact to those skilled in the art. Additionally, beside the piezoelectric motor, any kind of AC motor or DC motor, which is combined an electronic brake function or a manual driving module (410), is possibly used. This is also well known fact to one skilled in the art. Thus, the detailed description is omitted.

Also, the planetary gear related to the present invention for driving a sunshade driving device (400a) includes; fixedly coupled or inserted to the sunshade rotating shaft (not shown) through a driven recessed protrusion (451a) of the first pick-up member (451), fixed and supported by the fixing unit, such as a bra-R or a sunshade closing case (not shown), and covered by a sunshade cover (not shown) such as a sunshade rail. The binding for the sunshade is easily understood by those skilled in the art and the detailed description will be omitted.

Additionally, the planetary gear train (430) as described in more detail in FIG. 5 includes; the planetary gear carrier (431) consists of a ring gear (432); a free gear (433); a sun gear (434) formed gear teeth on one end with a predetermined width and length; the first bearing coupler (436). The planetary gear carrier (431) has at least one pin inserted to the free gear (433) to rotate freely. the first planetary gear carrier (431a) formed a hole with a predetermined diameter at center for coupling to the end (431c) of the second planetary gear; a pin fitted free gear (433) is meshed inside of the ring gear (432); the first planetary gear carrier (431a) is faced on one side of the second planetary gear carrier (431b) to be interconnected by a pin; opposite outer surface of the second planetary gear carrier (431b) forms predetermined length and diameter with clearance for press-fitting to a bearing, the end of the coupling (431c) is selectively fixed to one of the rotating shaft (491) of the electric driving module (490) or the manual driving module (410) herein, the rotating shaft (491) of the electric driving module (490) is coupled to the sun gear (434), the manual driver (414) of the manual driving module (410) (describe later) is fixedly coupled; accordingly, a gear teeth formed on the inner peripheral surface, opened one side end, and is fixedly coupled to the coupler cap (436d), a central hole having a predetermined diameter is formed at the center of the other end; one coupling end (431c) of the second planetary gear carrier (431b) is formed to pass through; the multiple fixing tab is formed on the surface of the ring gear (432) excluding the center hole to be fixedly coupled to the second pick-up member (452).

And, the first bearing coupler (436) has; a press fitting shaft (436a) to press fitted into the hole of the first planetary gear carrier (431a); a snap ring (436b) for preventing the falling of the press fitting shaft (436a); a first bearing (436c) is press-fitted into the inner peripheral surface of the press fitting shaft (436a); a coupler cap (436d) consists of the first bearing (436c) press-fitted to the inner peripheral surface and a stepped outer peripheral surface press-fitted into the ring gear (432); the ring gear (432) firmly coupled to the first planetary gear carrier (431a), but the first planetary gear carrier (431a) and the ring gear (432) is freely rotated.

Figure 1D:
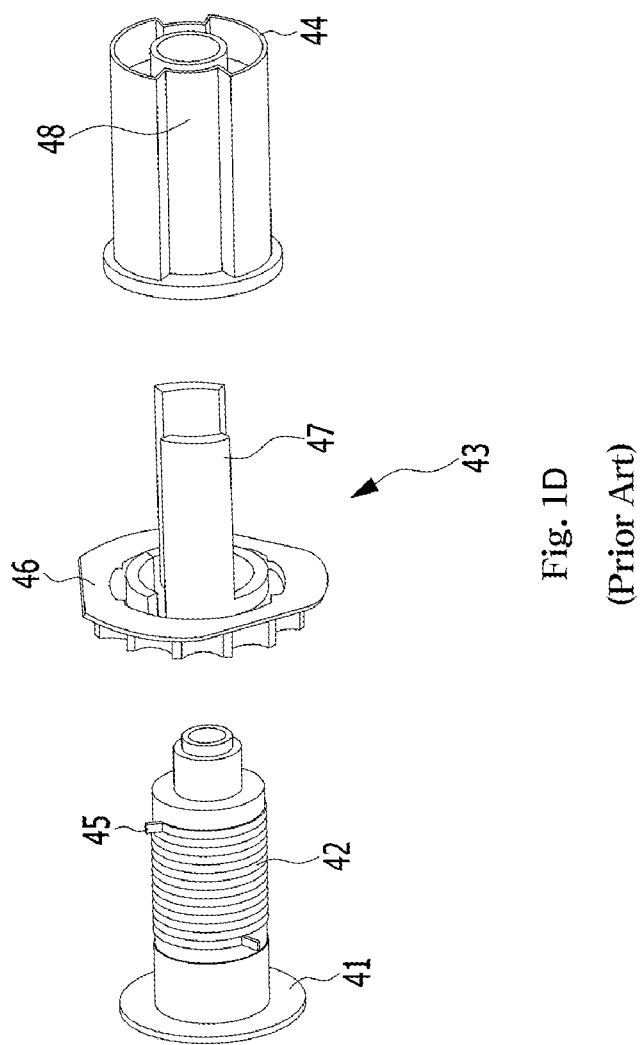
FIG. 1D is an exploded perspective view of a roll sunshade input driving module.

In addition, the second pick-up member (452) is formed a gear teeth on the inner peripheral surface; opened one end; a central hole having a predetermined diameter is formed at the center of the other end to pass through one coupling end (431c) of the second planetary gear carrier (431b); the multiple fixing tab is formed on the surface, excluding the center hole; coupled to a selected member of the planetary gear train (430) of the ring gear (432), the sun gear (434) and the planetary gear carrier (431) being used output; and the outer peripheral surface has the driving recess protrusion (452a) is fitted a sunshade rotating shaft (refer to FIG. 1A, 23) of the screen sheet fastener (refer to FIG. 1A, 24) fixedly coupled to the ring gear (432).

Further, the first pick-up member (451) is fitted to the manual driver (414) of the manual driving module (410) on the inner peripheral surface for freely rotating the outer peripheral surface (described later); the driven recessed protrusion (451a) formed on the outer peripheral surface coupled to the sunshade rotating shaft (not shown), and rotated by rotation of the sunshade rotating shaft (not shown); unlike the pick-up member of the prior art (see FIG. 1A and FIG. 2, 44, 97), the sunshade rotating shaft is not driving (not shown), it is driven by the sunshade rotating shaft (not shown) that is the evidently different feature; eventually, it is driving the encoder plate (440a) of the encoder unit (440), at the same time, the manual driver (414) of the manual driving module (410) is fitted to be rotatable; and the sunshade rotating shaft (not shown) is supported rotatable on the end.

On the other hand, the encoder device (440) of the electric driving module (490) includes an encoder plate (440a); one side fixed the encoder plate (440a); the other side coupled to the first pickup member (451); when the first pick-up member (451) is rotated by the rotation of the sunshade rotating shaft (not shown), the encoder holder (440b) is rotated together; the encoder holder (440b) has an encoder holding member (440c) being placed between the encoder plate (440a) for firmly fixing the encoder plate (440a); the encoder plate (440a) has a sensor module (440d) for detecting the position; and the sensor module (440d) (not shown) is electrically connected to a control module of the electric driving module (490) for detecting the rotational speed and position of the sunshade rotating shaft (not shown).

Also, if the encoder holder (440b) is placed on the position to provide the speed and location of the sunshade rotating shaft (not shown), it can be installed directly on the sunshade rotating shaft (not shown) integrally; it is possible to modify in various form; here, it is coupled to the first pick-up member (451) and provided to be driven by the first pick-up member (451); since it is easily modified for the person skilled in the art, the detailed installing description of the encoder holder (440b) and the encoder plate (440a) will be omitted.

Additionally, the combination of the sensor module (440d) and the encoder plate (440a) is widely varied, such as optical/magnetic; here, the encoder plate (440a) formed a donut-shaped slit of a predetermined width with constant interval and the optical sensor module (440d) are provided; when the encoder plate (440a) is placed between and rotated, it detects the blocking or passing of the light on the slit and the interface; it is easy to understand by one of ordinary skill in the art, thus, further detailed explanation is also omitted.

Additionally, the outer peripheral surface of the manual driving module (410) is inserted the spring member (411b) formed the locking protrusion (411a); the inner peripheral surface has a hollow (411c) having a predetermined diameter for passing through the rotating shaft (491) of the electric driving module (490) or the shaft connector (492); and the manual stopper (411) is firmly fixed to the hollow (411c) sunshade fixing bra-R (not shown) being inserted through one end; the manual stopper (411) is fitted into the inside, when it is rotated, the spring body of the spring member (411b) of the manual stopper (411) pushes the locking protrusion (411a) in the opening direction to release the friction force of the spring member (411b); the locking protrusion (411a) for releasing the friction force is formed in the opening part of the cylindrical hollow body of the wrap spring drive member (412); the wrap spring drive member (412) is integrally formed on one side or provided fixedly engage-able multiple coupling ends (see FIG. 8A 417c of the first embodiment of the present invention); the ball chain (not shown) or the rotating string (not shown) is mounted between the body and body to pull; the manual pulley (417a) is formed integrally or coupled to the coupling end (see FIG. 8A, 417c for the first embodiment of the present invention); the wheel driving member (417) is rotating the wrap spring drive member (412); the inner peripheral surface of one side end has the coupling end (431c) of the second planetary gear carrier (431b) fixedly coupled to the coupling member (414a); the third coupling unit (not shown) and the multiple of engage-able coupling protrusion (414b) is formed on one side end portion of the outer peripheral surface; the remaining outer circumferential surface, the other end, the first pick-up member (451) is inserted in order to freely rotate and formed cylindrical shape; at the same time, a hollow with a predetermined diameter is formed on the inner circumferential surface to pass through the rotating shaft (491) of the electric driving module (490) and the shaft connector (492), which has a predetermined length inserted; other end of the wrap spring drive member (412) is inserted and coupled to the manual stopper (411); when it rotates by itself, the locking protrusion (411a) of the spring member (411b) consisting of the manual stopper (411) is pushed the spring body to the narrow direction for increasing the frictional force in the spring member (42) for stopping; when the wrap spring drive member (412) rotates, the manual driver (414) formed a locking projection (not shown) on the inner circumferential surface is rotated pushed by the locking-release projections (412a); the manual driver (414) has inserted into inside of the first pick-up member (451) coupled to the sunshade rotating shaft (not shown) to freely rotate.

The wheel driving member (417) is possibly varied to other forms; the wrap spring drive member (412) is separated the coupling end (417c, refer to FIG. 8A, the first embodiment of the present invention) of the modified wheel drive member (417, refer to FIGS. 8A and 8B for the first embodiment of the present invention); when a user rotates the manual pulley (417a) through a ball chain (not shown) or a rotating string (not shown), the bi-directional driving clutch (417b, refer to FIGS. 8A and 8B, the first embodiment of the present invention) drives the wrap spring drive member (412) by friction; Here is, as shown in FIG. 6, the bi-directional driving clutch (417b, see FIGS. 8A and 8B, the first embodiment of the present invention) is not included, but the manual pulley (417a) is integrally formed with the spring driving member (412) formed integrally with the wheel driving member (417); such a manual driving module (410) is different from the conventional manual driving module (40, 90, see FIG. 1D & FIG. 2D); the user rotates the manual pulley (417a) through the ball chain (not shown) or the rotating string (not shown), it is coupled to the second planetary gear carrier (431b) without directly driving the sunshade rotating shaft (not shown); the operating function of the manual driver (414) according to the present invention, when the second planetary gear carrier (431b) is rotated, the locking protrusion (411a) of the spring member (411b) is pushed the spring body to the narrowed direction and as a result, the second planetary gear carrier (431b) cannot rotate; when the wrap spring drive member (412) is rotated by pulling manually the ball chain or the rotating string (not shown), the second planetary gear carrier (431b) is rotated by the rotational force; as a result, the planetary gear carrier (431) of the planetary gear train (430) is selectively stopped or driven that is clearly different from the prior art of the manual driving module (40, 90, see FIG. 1D & FIG. 2D).

On the other hand, the manual driving module (410) has the cap member (416) being coved over the outer peripheral surface of the manual pulley (417a), not to fall off the ball chain (not shown) or the rotation string (not shown); the cap member (416) is supported or received the manual driving module (410); the first embodiment of the present invention is further included a cap member (416) being cover-up the outer peripheral surface of the manual pulley (417a) to prevent the fall of the ball chain (not shown) or the rotating string (not shown).

As shown in FIG. 4A, the encoder device (440) and the manual driver (414) are inserted into the inside of the first pick-up member (451); the manual driver (414) of the manual driving module (410), which is protruded to the outside, coupled to the second planetary gear carrier (431b) of the planetary gear train (430); the second pick-up member (452) is coupled to the ring gear (432) of the planetary gear train (430); the rotating shaft (491) of the piezoelectric motor is coupled to the sun gear (434) of the planetary gear train (430) through the shaft connector (492); thus, the assembly of the sunshade driving system (400a) applied a planetary gear train with respect to the present invention is provided.

Below, the operation of the sunshade driving device (400a), which is applied the planetary gear of the present invention is explained; If the sun gear (434) is stopped by the piezoelectric motor i.e., the manual mode that the user rotates the manual pulley (417a) by pulling the ball chain (not shown) or the rotating string (not shown), then the power is transmitted through the wheel driving member (417), the wrap spring drive member (412), the manual driver (414), the second planetary gear carrier (431b), the ring gear (432) and the driving recess protrusion (452a) of the second pick-up member (452), the screen sheet fastener (24, see FIG. 1A) of the sunshade rotating shaft (23 see FIG. 1A), the sunshade rotating shaft (not shown) to drive the sunshade driving device freely by manual, regardless of driving or stopping of the electric driving module (490); when the user stops the manual operation by releasing the ball chain (not shown) or the rotating string (not shown), the sun gear (434) is stopped by the weight of the sunshade screen; the rotational force is stopped by the electric driving module (490); through the sunshade rotating shaft (not shown), the force is transmitted to the manual driver (414) to rotate; the friction force of the spring member (42) is increased by pushing the locking protrusion (411a) of the spring member (411b) consisted of the manual stopper (411) in the direction of narrowed the spring body to stop the operation of the sunshade, at the same time, the second planetary gear carrier (431b) coupled to the manual driver (414) is stopped; as a result, the planetary gear carrier (431) of the planetary gear train (430) is fixed state not to rotate; conversely, when the user is operated the sunshade by the electric driving module (490), the power is transmitted through the rotating shaft (491) of the electric driving module (490), the shaft connector (492), the sun gear (434) of the planetary gear train (430), the ring gear (432), the driving recess protrusion (452a) of the second pick-up member (452), the screen sheet fastener (24, see FIG. 1A) of sunshade rotating shaft (23, see FIG. 1A), the rotating shaft (not shown) to freely drive the sunshade by the electric driving module, regardless of driving state or stopping state of the manual driving module (410).

Like this, the present invention is related to the sunshade driving device (400*a*) applied the planetary gear train consisting of the operational structure of the manual driving module (410); there is a notable difference between the roll sunshade input driving module (400), which is directly driving the sunshade rotating shaft (not shown) as the conventional manual driving sunshade, and the slat sunshade input driving module (90); it is also different that the sunshade driving method applied the conventional electric motor to directly drive the sunshade rotating shaft (not shown).

The sunshade driving device (400*a*) applied the planetary gear train, which is related to the present invention, a planetary gear train (430) is crossed between the electric driving module (490) and the manual driving module (410); the planetary gear train (430) consisting of the planetary gear carrier (431) and the sun gear (434) being selectively operated for alternating the input driving or stopping to output the single output-driving through the ring gear (432).

For example, according to the sunshade driving device using a planetary gear train, it has a merit to alternately operate the manual driving or the electric driving without interruption each other, at the same time; when either one side is broken, the other side can be operated as long as maintaining the stopped state; it effetely has the benefit of the conventional manual driving and the benefit of the electric driving.

addition, the second pick-up member (452) can cover-up the planetary gear train (430) entirely, by using bolt, screw, press-fitting unit and adhesive; the manual driver (414) is directly connected to the second planetary gear carrier (431*b*); of course, it is possible to form integrally; it is possible to couple the manual driver (414) to the first planetary gear carrier (431*a*) in place of the second planetary gear carrier (431*b*); the manual driver (414) is coupled to the ring gear (432) and the planetary gear carrier (431) is coupled to the second pick-up member (452); at this time, the planetary gear carrier (431) connect the rotation shaft (491) of the electric driving module (490), and the sun gear (434) of the planetary gear train (430) is possibly connected to the second pick-up member (452); also, the electric driving module (490) and the manual driving module (410) is possibly arranged between the planetary gear train (430); it is only an example showing the variation of the sunshade driving device (400*a*), which is applying a planetary gear train.

The numeric number (432*a*) is for a ring gear, the numeric number (434*a*) is for a sun gear, the numeric number (433*s*) is a shaft of the planetary gear, the numeric number (414*c*) is the inner locking protrusion of the manual driver, the numeric number (436*c*) is a bearing, the numeric number (493) is a piezoelectric motor, and the numeric number (412*b*) is a manual driving wheel.

First Embodiment

Figure 7:
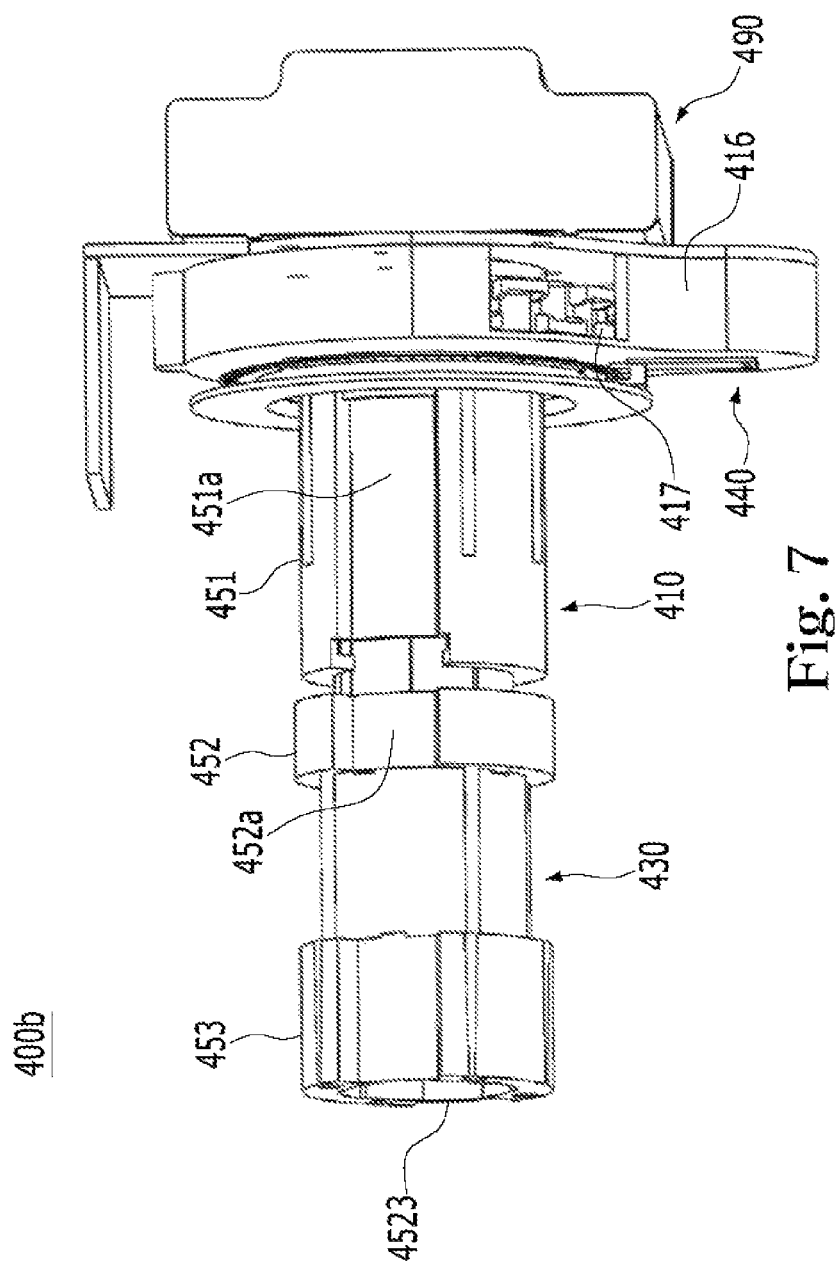
FIG. 7 is a perspective view of the sunshade driving device having a returning function of the wheel driving member according to the first embodiment of the present invention.
Figure 9A:
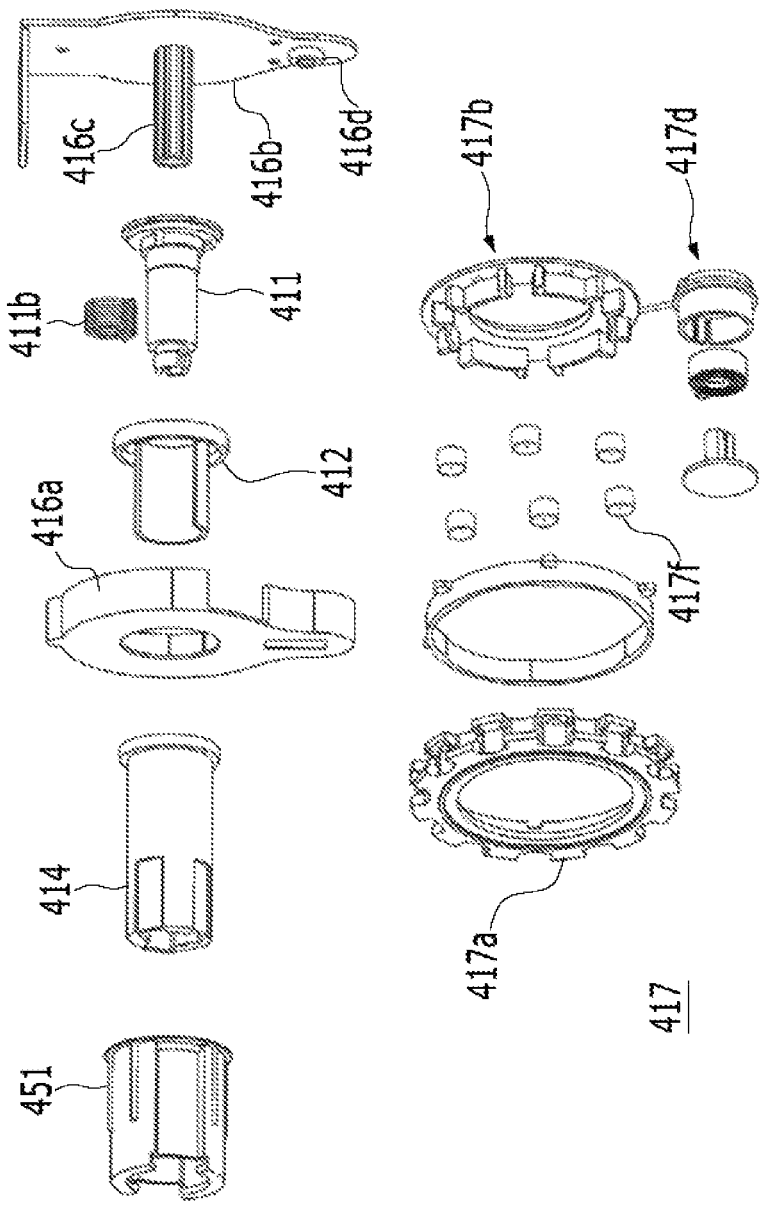
FIG. 9A is a partial exploded perspective view illustrating the assembly process of the manual driving module, which is a component of the sunshade driving device having a returning function of the wheel driving member according to the first embodiment of the present invention.
Figure 9B:
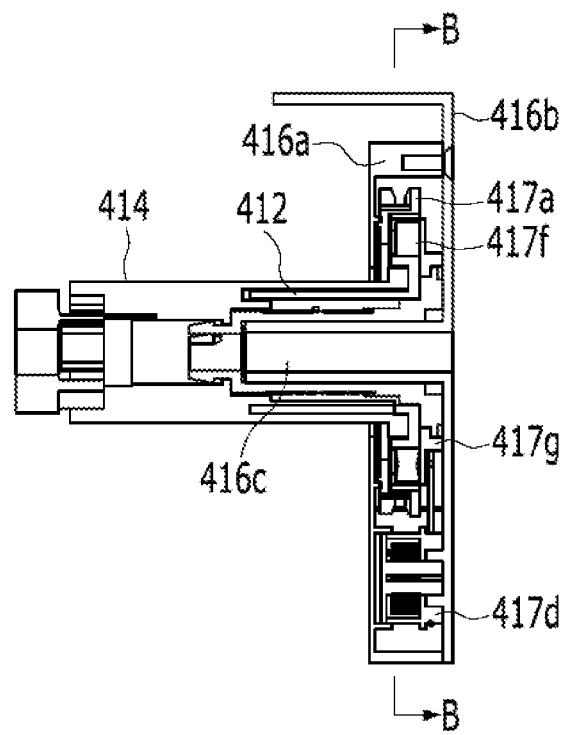
FIG. 9B is a schematic diagram of the manual driving module.
Figure 9C:
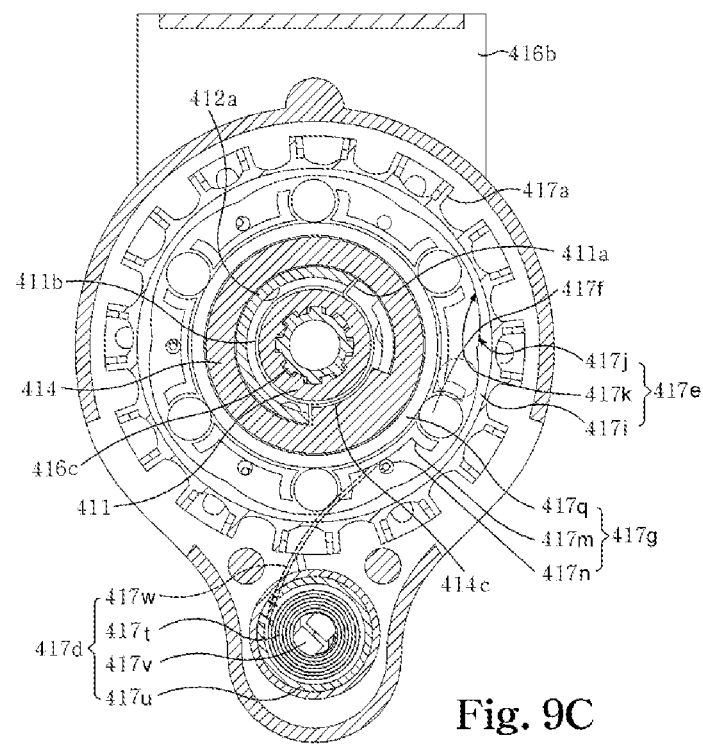
FIG. 9C is a cross-sectional view of the line B-B of FIG. 9B.
Figure 10:
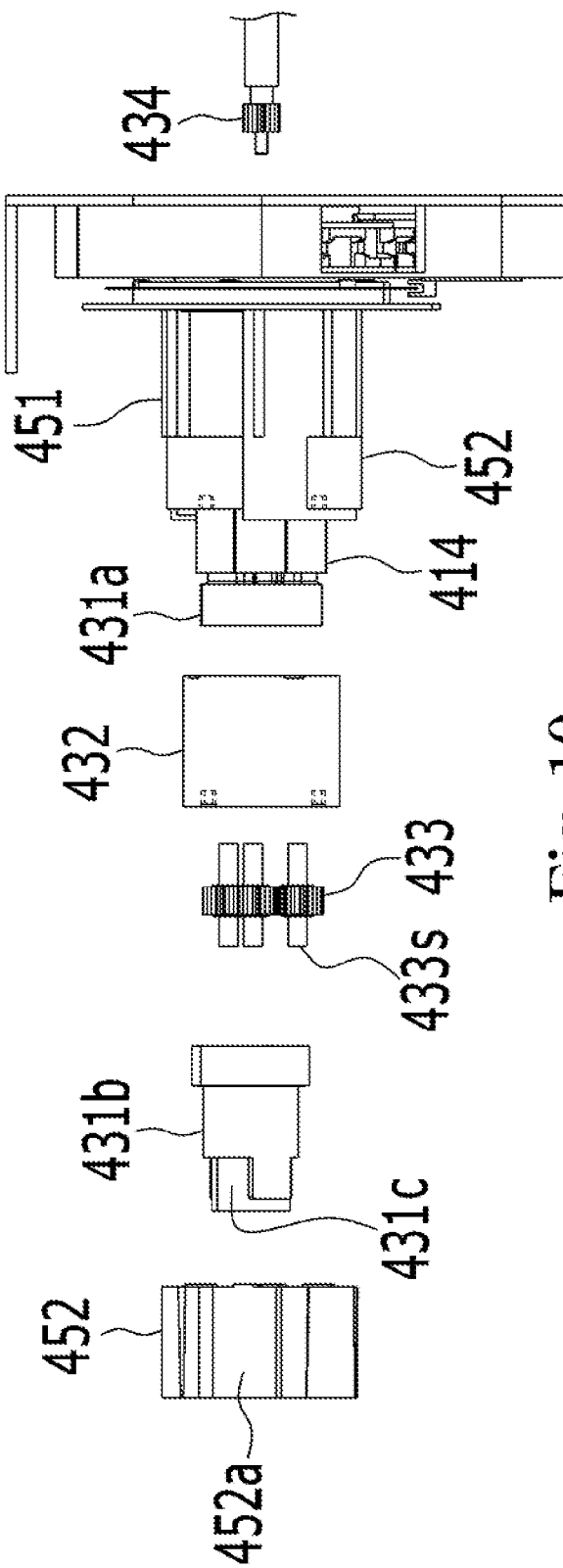
FIG. 10 is a cross-sectional view according to the line 1C-1C of FIG. 1A.

FIG. 7 is a perspective view of the sunshade driving device having a returning function of the wheel driving member according to the first embodiment of the present invention, FIG. 8A is a partial exploded perspective view of a manual driving module, which is one component of the sunshade driving device having a returning function of the wheel driving member according to the first embodiment of the present invention, FIG. 8B is a plan view of a bi-directional driver and a bi-directional driver clutch of a manual driving module, FIG. 9A is a partial exploded perspective view illustrating the assembly process of the manual driving module, which is a component of the sunshade driving device having a returning function of the wheel driving member according to the first embodiment of the present invention. FIG. 9B is a schematic diagram of the manual driving module. FIG. 9C is a cross-sectional view of the line B-B of FIG. 9B and FIG. 10 is an exploded perspective view of a planetary gear train, which is one component of the manual drive module having a returning function of the wheel driving member of the sunshade driving device according to the first embodiment of the present invention.

As shown in FIG. 7, FIGS. 8A and 8B, FIGS. 9A, 9B and 9C, and FIG. 10, the sunshade driving device (400*b*) having a returning function of the wheel driving member according to the first embodiment of the present invention is consisted of; the wheel driving member (417) of the manual driving module (410), the cap member (416) integrally formed the planetary gear train (430) and the bra-R, and the wrap spring drive member (412) related to 'the sunshade driving device applied the planetary gear train' of the present invention; the sunshade driving device (400*a*) consisted of the wheel driving member (417) of the manual driving module (410), the planetary gear train (430), the cap member (416) and the wrap spring drive member (412) is different comparing with "the sunshade driving device applied the planetary gear train" of the present invention; the rest part of them with respect to the present invention is identical; accordingly, the identical members in the sunshades driving device applied the planetary gear train is used the same the numeric number; because the sunshade driving device applied the planetary gear train has disclosed the same members, the detailed description will be omitted.

First, as shown in FIG. 9A, the cap member (416) is integrally formed the bra-R; the fixing shaft (416*c*) having a protruded hollow is formed on the body and the front central of the body; the lower part of the body has the coupling groove on the inner circumferential surface, and on the outer peripheral surface, a fixing end (416*d*) having a cylindrical-shape with a given diameter is integrally formed with the second cap part (416*b*); the first cap part (416*a*) coupled to the second cap part (416*b*) is formed an opening having a predetermined depth on one side; the cap member (416) of the second embodiment of the present invention, the outer peripheral surface of the manual pulley (417*a*) is covered as the sunshade driving device (400*a*) of 'the sunshade driving device using the planetary gear train prevent to fall-off the ball chain (not shown) or the rotating string (not shown); at the same time, supporting the end of the manual driver (414), so, the wheel driving member (417) and the wrap spring drive member (412) (as described later) are received the inside.

Further, the manual driving module (410) is a member of the sunshade driving device (400*b*) having a returning function of the wheel driving member consisting of the wheel driving member (417) and the wrap spring drive member (412) as shown in FIG. 7, FIGS. 8A and 8B and FIGS. 9A and 9B; the wheel driving member (417) of the manual driving module (410), which is a member of the sunshade drive device (400*a*) using a planetary gear train is unlike with the wrap spring drive member (412); looking at this, the coupling end (417*c*) is formed, the wheel driving member (417) is formed integrally with the manual pulley (417*a*), and the wrap spring drive member (412) is formed the hollow body of the sleeve on one end side for separately providing each of them; the wrap spring drive member (412) is inserted into the inner peripheral surface; a coupling end (417*c*) of the wheel drive member (417) is integrally formed or fitted; when a user rotates the manual pulley (417*a*) by pulling the ball chain (not shown) or the rotating string (not shown), the bi-directional driving clutch (417*b*) for driving the wrap spring drive member (412) by the frictional force.

in this case, the bi-directional driving clutch (417*b*) as shown in FIGS. 8A and 8B is integrally formed and inserted to be fixed the body of the wheel driving member (417); so, the fitting protrusion (417*h*) is formed on the body (417*i*) of the outer peripheral surface with a constant interval; the bi-directional driver (417*e*) is provided the bi-directional moving grooves formed on an arc-shape with a constant interval on the inner peripheral surface of the body (417*i*) having a small diameter (417*j*) and a large diameter (417*k*); a shaft bore (417*q*) at the center of the disk-shaped body and the multiple rope coupler (417*n*) formed along with its peripheral is mounted a returning rope (417*w*) (described later) for winding/unwinding by a taking-up member (417*p*); on the upper surface of the body, a unit elastic member holder (417*m*) has a predetermined diameter formed the curved arc-shape on both sides; a multiple rows of the retainer (417*g*) is arranged along the periphery of the shaft bore (417*q*) with the constant interval; the bi-directional driver (417*e*) is included a roller member (417*f*) inserted rotatable between the large diameter (417*k*) of the bi-directional moving grooves and the unit elastic member holder (417*m*) of the retainer (417*g*); when the bidirectional driver (417*e*) is rotated to left and right, it pushes the roller member (417*f*) to left and right to roll between arc-shape of the small diameter (417*j*) and the large diameter (417*k*) of the bi-directional moving grooves of the bidirectional driver (417*e*); as the roller member (417*f*) is closer to the small diameter (417*j*), it is pressed or inserted by the small diameter (417*j*), the other end is pushed to the shaft bore (417*q*) of the retainer (417*g*) to be protruded or to freely rotated in the position of the large-diameter (417*k*); as a result, the other end protruded to the shaft bore (417*q*) of the retainer (417*g*), the wrap spring drive member (412) is inserted to the shaft bore (417*q*) by retreating or advancing; the outer peripheral surface of the hollow body sleeve is tightly locking or releasing to drive the wrap spring drive member (412) by the friction force; the first embodiment of the present invention includes the bi-directional drivers (417*e*), which is fixedly inserted to the coupling end (417*c*) formed on the inner peripheral surface of the wheel driving member (417) through a fitting protrusion (417*h*); the roller member (417*f*) is selected either one of the spherical ball or a cylindrical roller having a predetermined length and diameter; the cylindrical roller is provided in the first embodiment; each of the unit elastic member holder (417*m*) is included a pair of the unit elastic member further a member (not shown); at this time, the unit elastic member (not shown) is made of a magnet piece or a spring; when the retainer (417*g*) is stopped to rotate, the unit elastic member (not shown) pushes each of the roller member (417*f*) to the left and right to set the neutral position i.e., the position of the large diameter of the bi-directional moving groove (417*k*) of the bidirectional driver (417*e*); In the first embodiment of the present invention, the unit elastic member (not shown) does not include; beside of such a unit elastic member (not shown), the overall roller member (417*f*) sets in the neutral position at once, by continuously rotating the entire retainer (417*g*) or rotating opposite direction of the predetermined angle; the Republic of Korea Patent Registration No. 1997-0011290 and the Patent Registration No. 20-0260431 discloses the entire elastic member (not shown) and the unit elastic member (not shown); it does not included in the first embodiment of the present invention; the more detailed explanation is omitted here because it is known fact in the art; the reason is that the spring driving member (411*b*) of the manual stopper (411), which is a component of the manual driving module (410) is acting the overall elastic member (not shown); a user release the ball chain (not shown) or the rotating string (not shown) to stop the manual operation, the spring member (411*b*), which was tightly narrowed by the body is returned to the original position by the elastic force; thus, the overall roller member (417*f*) is elastic, at once.

On the other hand, the bi-directional driving clutch (417*b*) is when the user released the ball chain or the rotating string (not shown) to stop the manual operation, a retainer (417*g*) is rotated reversely by the reverse-rotating unit (417*d*); the first embodiment of the present invention is further included the bi-directional driving clutch (417*b*) in the reverse rotating unit (417*d*) for continuously reverse-rotating the overall retainer (417*g*).

In addition, the reverse rotating unit (417*d*) according to the first embodiment of the present invention consisting of: a spring (417*t*); a fixing pin (417*v*) is fixedly coupled to a fixing end (416*d*) of the second cap part (416*b*), which is a component of the cap member (416); a spring bobbin (417*u*) having a containing groove formed a cylindrical shape with a preset depth for receiving a spring (417*t*) on one end of the inner circumferential surface and a rope coupler on opposite end of an outer peripheral surface; a retuning rope (417*w*) is coupled to one end of the rope coupler of the spring bobbin (417*u*) and opposite end of the rope coupler (417*n*) of the retainer (417*g*) of the bi-directional driving clutch (417*b*); the user pulls the ball chain (not shown) or the rotating string (not shown) to rotate the manual pulley (417*a*) of the wheel drive member (417), the bi-directional driver (417*e*) of the bidirectional driving clutch (417*b*), which is coupled therein, is rotated to roll the roller member (417*f*) to be inserted into the small diameter (417*j*) of the retainer (417*g*); eventually, the retainer (417*g*) is rotated by the frictional force, the returning rope (417*w*) is wound by the taking-up member (417*p*) of the retainer (417*g*), at the same time, the returning rope (417*w*) wound on the spring bobbin (417*u*) is released, the spring bobbin (417*u*) is rotated to store the rotational force in the spring (417*t*); conversely, the user released the ball chain or the driving string, the spring bobbin is reversely rotated by releasing the restored force in the spring; the returning rope (417*w*) is reversely rotated for winding; at the same time, other side of the returning rope (417*w*) of the retainer (417*g*) is wound reversely and the taking-up member (417*p*); is reversely rotated; at this moment, sequentially, the bi-directional driver (417*e*) is reversely rotated; eventually, the manual pulley (417*a*) is reversely rotated and the ball chain (not shown) or the rotating string (not shown) is retrieved in the backward.

Figure 1E:
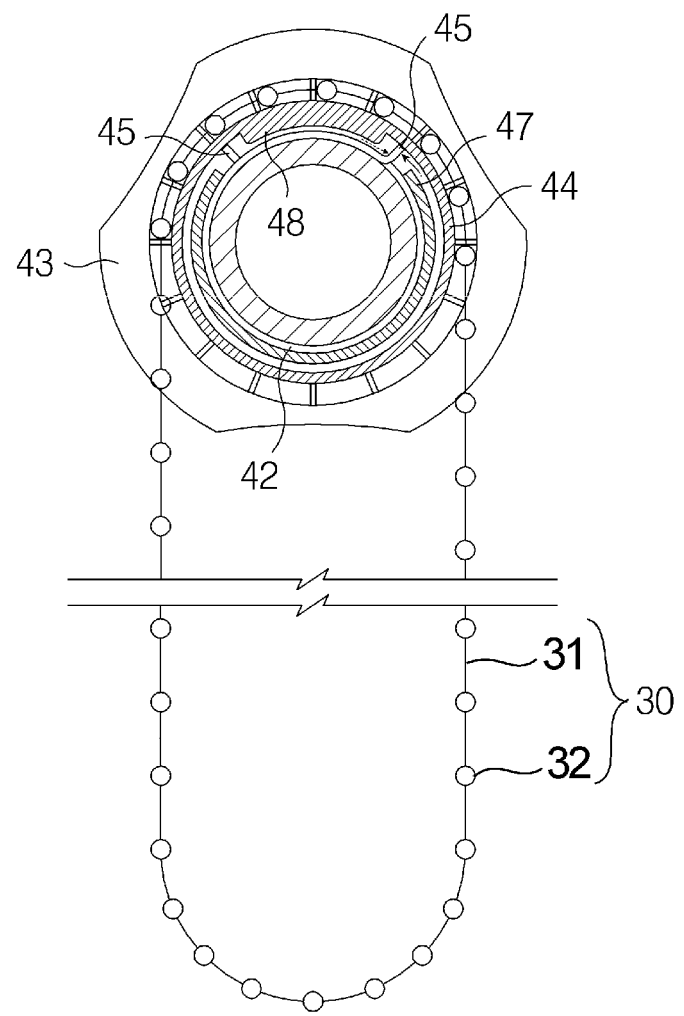
FIG. 1E is an assembled cross-sectional view showing a typical roll blind of a kind of conventional roll type sunshade.
Figure 2A:
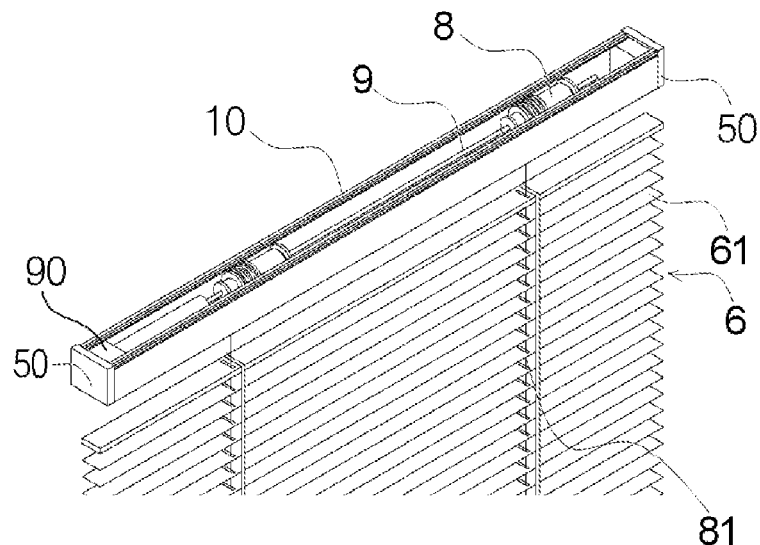
FIG. 2A is a perspective view showing a typical Venetian Blind, which is a kind of the conventional slat type sunshade.
Figure 2B:
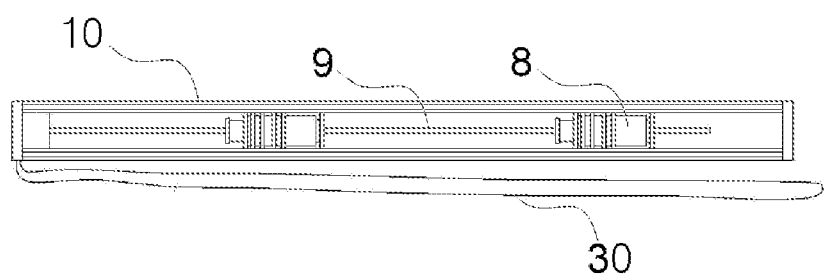
FIG. 2B is a plan view of FIG. 2A.
Figure 2C:
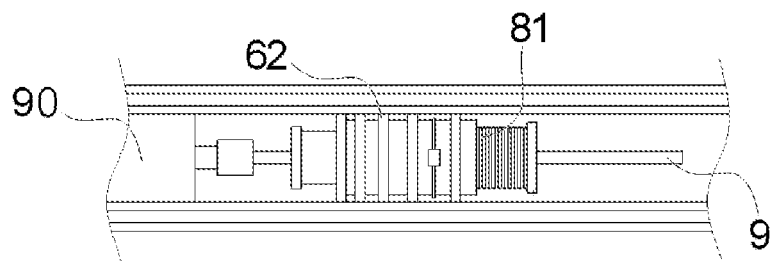
FIG. 2C is a partial detail of FIG. 2B.
Figure 2D:
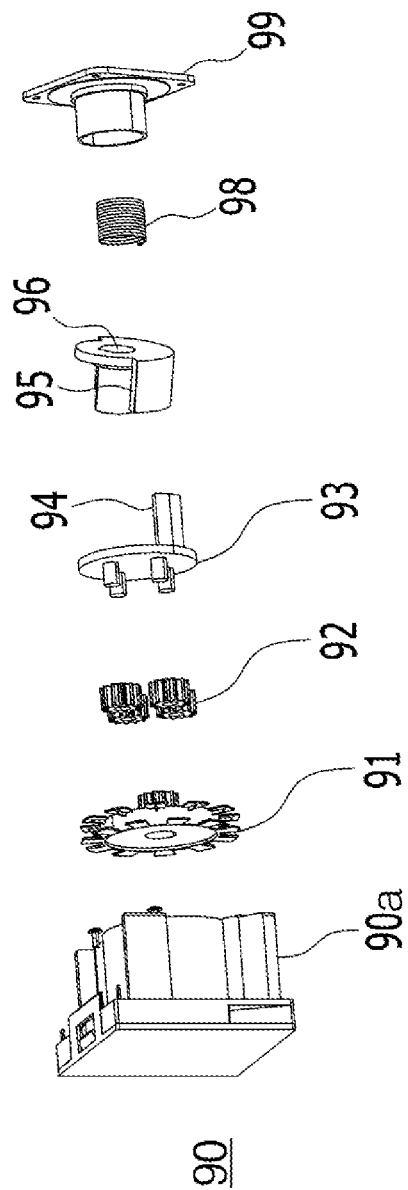
FIG. 2D is an exploded perspective view of a slat input driving module.
Figure 3:
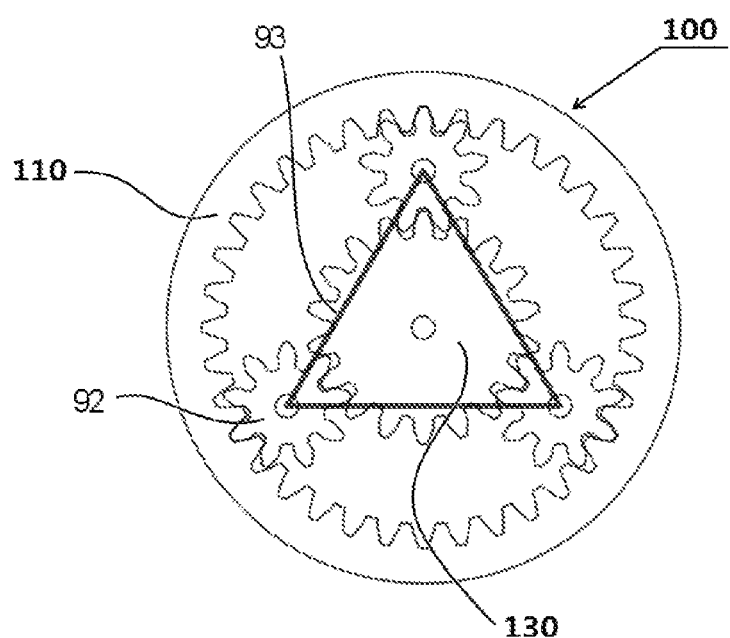
FIG. 3 is a diagram illustrating the operating principle and its application of the conventional planetary gear.

In addition, the planetary gear train (430) according to the first embodiment of the present invention as shown in FIG. 10, the engaging position of the second planetary gear carrier (431*b*) and the first planetary gear carrier (431*a*) is switched to fitted the manual driver (414), and the second pick-up member (452) and the third pick-up member (453) are added; the first embodiment of the planetary gear train (430) has identical configuration and operating principle of the present invention except the above two items; accordingly, hereinafter the detailed description with respect to the planetary gear train (430) will be omitted; the operation of the return function of the wheel driving member of the sunshade driving unit (400*b*) explains according to the first embodiment of the present invention; when the sun gear (434) is stopped by the piezoelectric motor (493) i.e., the manual mode, the user rotates the manual pulley (417a) through the ball chain (not shown) or the rotating string (not shown), sequentially, the wheel driving member (417), the bi-directional driving clutch (417b), the wrap spring drive member (412), the manual driver (414), the second planetary gear carrier (431b), the ring gear (432), the driving recess protrusion (452a) of the second and third pick-up members (452, 453), the sunshade rotating shaft (23, see FIG. 1) of the screen sheet fastener (24, see FIG. 1), the sunshade rotating shaft (not shown), the driving force is transmitted; regardless of driving or stopping of the electric driving module (490), the power is transmitted to the sunshade to rotate freely by manually; (sunshade rotation shaft is driven more stably due to the two pick-up member); when the user releases the ball chain (not shown) or the rotating string (not shown) to stop the manual operation, since the sun gear (434) is blocked by the electric driving module (490), the force tend to rotate by the weight of the sunshade screen is transmitted to rotate the manual driver (414) through the sunshade rotating shaft (not shown); the spring body is pushed by the locking protrusion (411a) of the spring member (411b) consisting the manual stopper (411) in the direction to be narrowed for increasing the frictional force (41) in the spring member to stop, the manual driver (414) coupled to the first planetary gear carrier (431a) is stopped; at the same time, the operation of the sunshade is stopped; as a result, the planetary gear carrier (431) of the planetary gear train (430) is locked and disabled state to rotate, at the same time, the ball chain (not shown) or the rotating string (not shown) is returned by the reverse rotating unit (417d); when the user conversely operates the sunshade by the electric driving module (490), a transmission of the rotating shaft (491) of the electric driving module (490), the shaft connector (492), the drive the sun gear (434) and the ring gear (432) of the planetary gear train (430), the driving recess protrusion (452a) of the second pick-up member (452), the sunshade rotating shaft (23, see FIG. 1) of the screen sheet fastener (24, see FIG. 1), the sunshade rotating shaft (not shown), the driving power is transmitted through to freely rotate, regardless of driving state or stopping state of the sunshade operation by a manual driving module (410).

Such a sunshade driving device (400b) having a returning function of the wheel driving member according to the first embodiment of the present invention is consisted of the manual driving module (410); the operational structure of the manual driving module (410) has a notable difference compared to the roll sunshade input driving module (400) and the slat sunshade input driving module (90), which is directly driving the sunshade rotating shaft (not shown) of the conventional manual operating sunshade; it is notable different comparing with the conventional electric motor directly driving the sunshade rotating shaft (not shown); it has a difference that the returning of the pulled ball chain (not shown) or rotating string (not shown) in the sunshade driving device (400a) applied 'the planetary gear train' of the present invention; further, the reverse rotating unit (417d) is not included to the bi-directional driving clutch (417b), the conventional 'U'-shape of the ball chain (not shown) or the rotating string (not shown) could be, of course, used.

In addition, the sunshade driving device (400b) having a returning function of the wheel driving member according to the first embodiment of the present invention is configured on the planetary gear train (430) between the electric driving module (490) and the manual driving module (410) the planetary gear train (430) consisting of the planetary gear carrier (431) and the sun gear (434), which is either one selected to alternatively operate to perform the input driving and stopping, and a single driving is output through the ring gear (432); it has the difference that the pulled ball chain (not shown) or rotating string (not shown) is returned, instead of using the 'U' shape loop of the ball chain (not shown) or rotating string (not shown), it is possible to use a straight single line of the ball chain (not shown) or the rotating string (not shown) or a easily separated end of the ball chain (not shown) or the rotating string (not shown); it is a useful invention that prevents the children's accident occurred by the U'-shaped loop of the ball chain (not shown) or the rotating string (not shown).

For example, according to the first embodiment of the present invention, it has a merit that the operation of the manual driving and the electric driving for the sunshade device can be sequentially mutual alternative or simultaneously performed without interference; if either one side is out of order, as far as it is maintaining stop state, it is possible to operate; it has an effect that bring intact of the advantage of the manual operation of the prior art and the advantage of the electric operation; in addition, there is an effect that it is possible to achieve the children's safety.

the planetary gear train has a numeral reference (430) of the first embodiment, the numeral reference (453) is for the third pick-up member, the numeral reference (453a) is for the recess protrusion of the third pick-up member, and the numeral reference (431c) is for a coupling member of the second planetary gear carrier.

Second Embodiment

Figure 11:
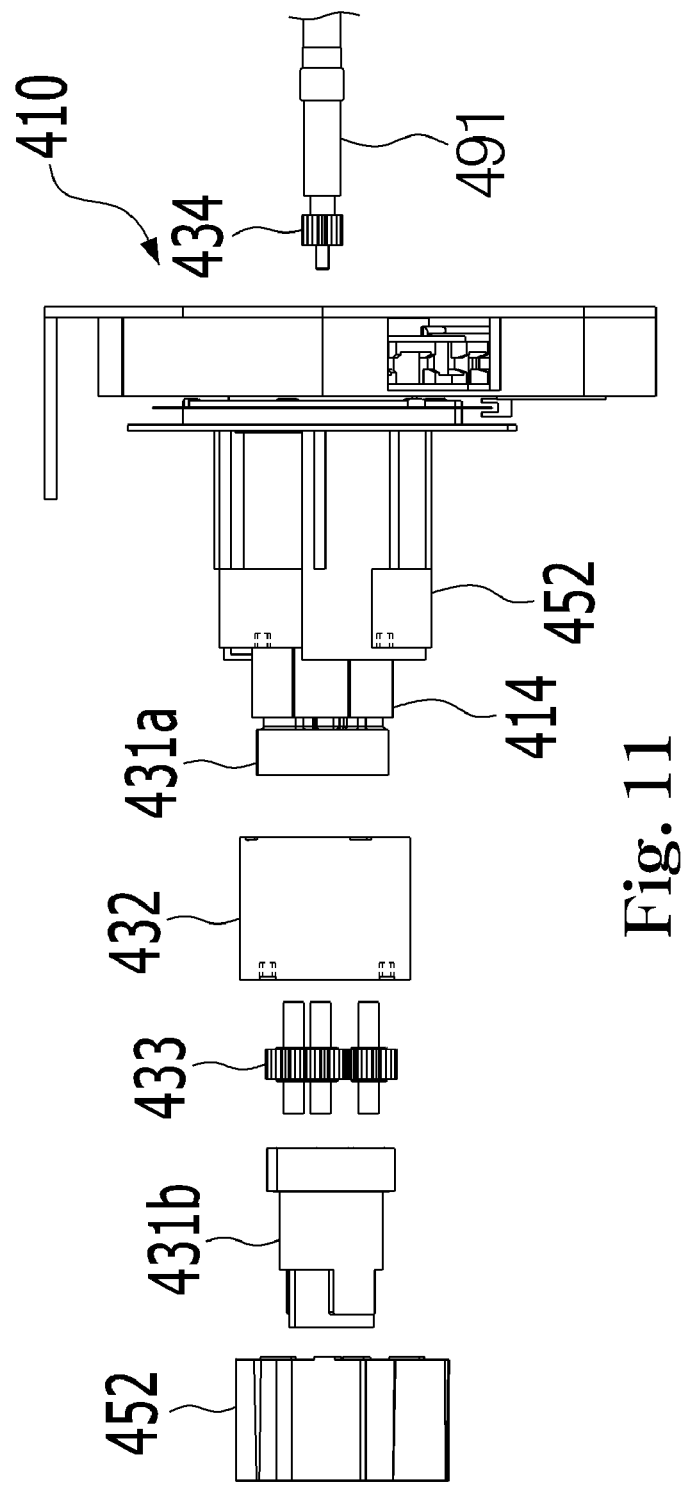
FIG. 11 is an exploded perspective view illustrating the sunshade driving device having a reduced manual returning function for manual driving only of the wheel driving member applied a gear ratio according to the second embodiment of the present invention.

FIG. 11 is an exploded perspective view illustrating the sunshade driving device having a reduced manual returning function for manual driving only of the wheel driving member applied a gear ratio according to the second embodiment of the present invention.

As shown in FIG. 11, the sunshade driving device (400c) having the returning function of the wheel driving member according to the second embodiment of the present invention has different configuration compared to the first embodiment of the present invention having the stop unit (not shown) and the rotating shaft (491) in place of the electric driving module (490); any one selected from the rest of the ring gear (432), the sun gear (434) and the planetary gear carrier (431) of the planetary gear train (430), which was not coupled, is coupled to the manual driver (414) of the manual driving module (410) to operate stop, exclusively including the stop unit only (not shown); this feature can be used to the manual operation applied the gear ratio; the sun gear (434) in the second embodiment of the present invention and the rest of the first embodiment of the present invention are same, therefore, the detailed description will be omitted; hereinafter, the operational relationship will be described in detail.

In case of the sun gear (434) is stopped by the stopping unit (not shown), the user rotates the manual pulley (417a) through the ball chain (not shown) or the rotating string (not shown), then, the power is transmitted through the wheel driving member (417), the bi-directional driving clutch (417b), the wrap spring driving member (412), the manual driver (414), the second planetary gear carrier (431b), the ring gear (432), the driving recess protrusion (452a) of the second pick-up member (452), the screen sheet fastener (24, see FIG. 1) of the sunshade rotating shaft (23, see FIG. 1), the sunshade rotating shaft (not shown) to operate the sunshade freely by manual; when the user releases the ball chain (not shown) or the rotating string (not shown) to stop the manual operation, since the sun gear (434) is stopped by the stopping unit (not shown), the force tend to rotate by the weight of the sunshade screen is transmitted to rotate the manual driver (414) through the sunshade rotating shaft (not shown); the spring body is pushed by the locking protrusion (411a) of the spring member (411b) consisting the manual stopper (411) in the direction to be narrowed for increasing the frictional force in the spring member (42) to stop, the manual driver (414) coupled to the first planetary gear carrier (431a) is stopped; at the same time, the operation of the sunshade is stopped; as a result, the planetary gear carrier of the planetary gear train (430) is locked and disabled state to rotate, at the same time, the ball chain (not shown) or the rotating string (not shown) is returned by the reverse rotating unit (417d).

Such an operational structure of the sunshade driving device (400b) having the returning function of the wheel driving member according to the second embodiment of the present invention has a notable difference comparing with the roll sunshade input driving module (400) and the slat sunshade input driving module (90) of the conventional manual operating sunshade, which is directly driving the sunshade rotating shaft (not shown).

Third Embodiment

Figure 12:
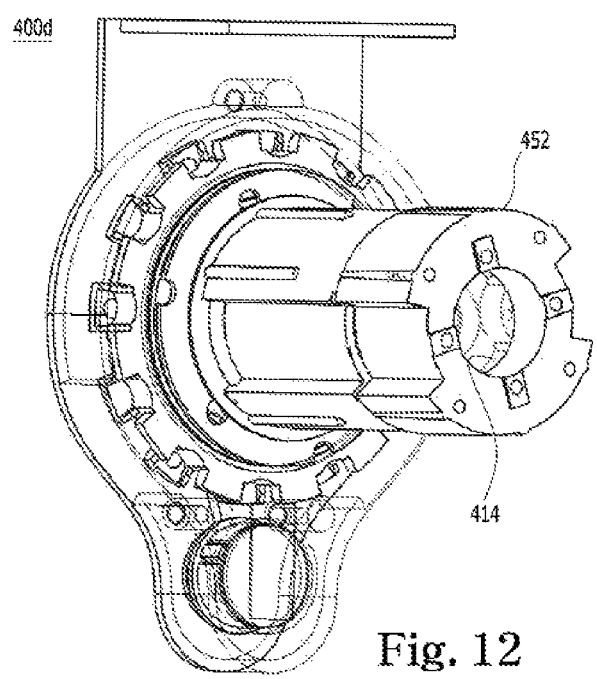
FIG. 12 is a perspective view illustrating the sunshade driving device having a reduced returning function for manual driving only of the wheel driving member to drive manual only according to the third embodiment of the present invention.

FIG. 12 is a perspective view illustrating the sunshade driving device having a reduced returning function for manual driving only of the wheel driving member to drive manual only according to the third embodiment of the present invention.

As shown in FIG. 12, unlike the first and second embodiments of the present invention, the sunshade driving device (400d) having a returning function of the wheel driving member according to the third embodiment of the invention is reduced state, excluding the electric driving module (490) and the planetary gear train (430); the second picked-up member (452) is combined to the coupling protrusion (414b) formed on the outer peripheral surface of the manual driver (414) for manual operation only; the rest of the member is as same as the first and second embodiments of the present invention, the detail description will be omitted; and following, the operating relationship will be described in detail.

the user rotates the manual pulley (417a) by pulling the ball chain (not shown) or the rotating string (not shown), then the driving force is transmitted through the wheel driving member (417), the bi-directional driving clutch (417b), the wrap spring drive member (412), the manual driver (414), and the driving recess protrusion (452a) of the second pick-up member (452), the screen sheet fastener (24, see FIG. 1A) of the sunshade rotating shaft (23 see FIG. 1A), the sunshade rotating shaft (not shown) to drive the sunshade driving device freely by manual; when the user stops the manual operation by releasing the ball chain (not shown) or the rotating string (not shown), the rotational force by the weight of the sunshade screen is transmitted to the manual driver (414) through the sunshade rotating shaft (not shown) to rotate; the friction force of the spring member (42) is increased by pushing the locking protrusion (411a) of the spring member (411b) consisted of the manual stopper (411) in the direction of narrowed the spring body to stop the operation of the sunshade, at the same time, the ball chain (not shown) or the rotating string (not shown) is returned by the reverse rotating unit (417d).

Fourth Embodiment

Figure 13A:
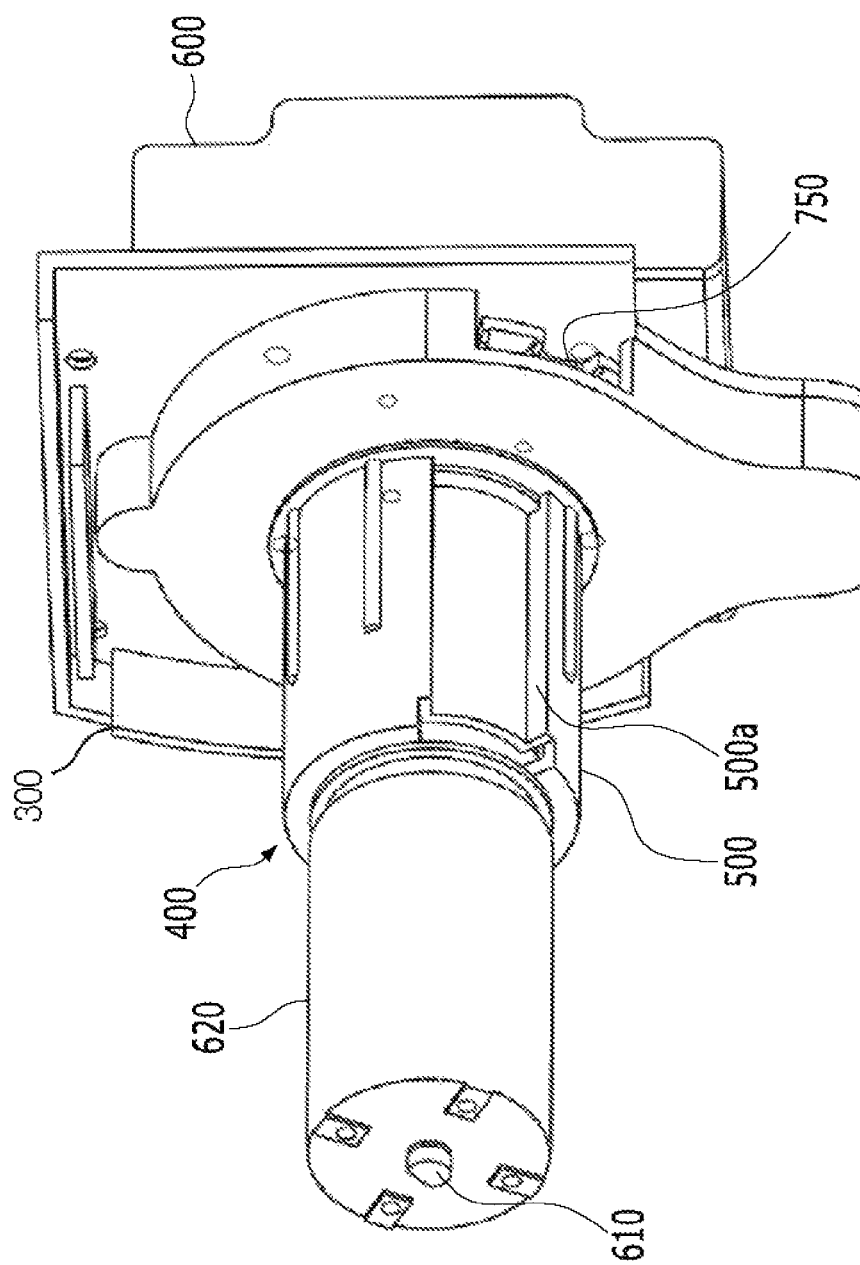
FIG. 13A is a perspective view showing a sunshade driving device having a return function of the wheel driving member according to the fourth embodiment of the present invention.
Figure 13B:
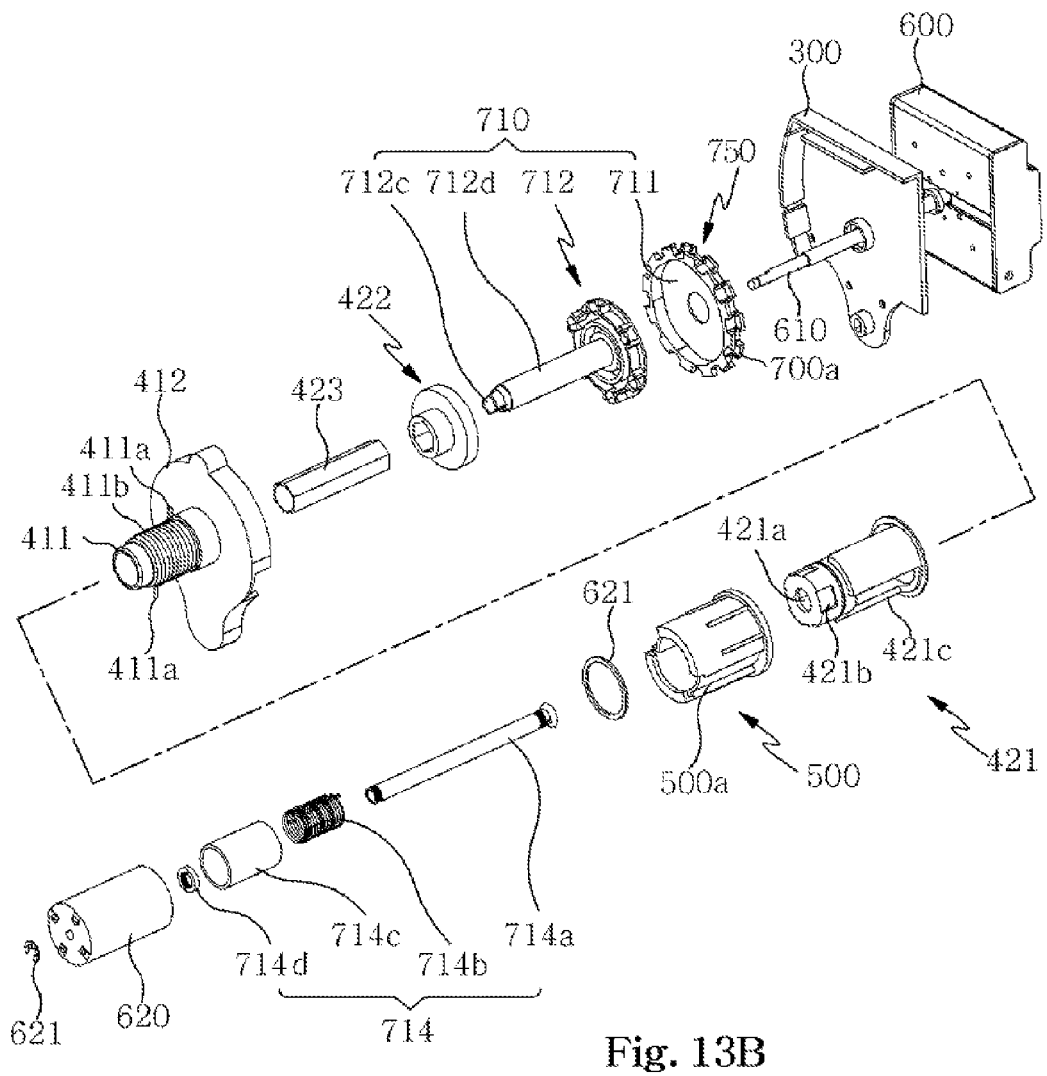
FIG. 13B is an exploded perspective view illustrating the sunshade driving device of FIG. 13A.
Figure 14A:
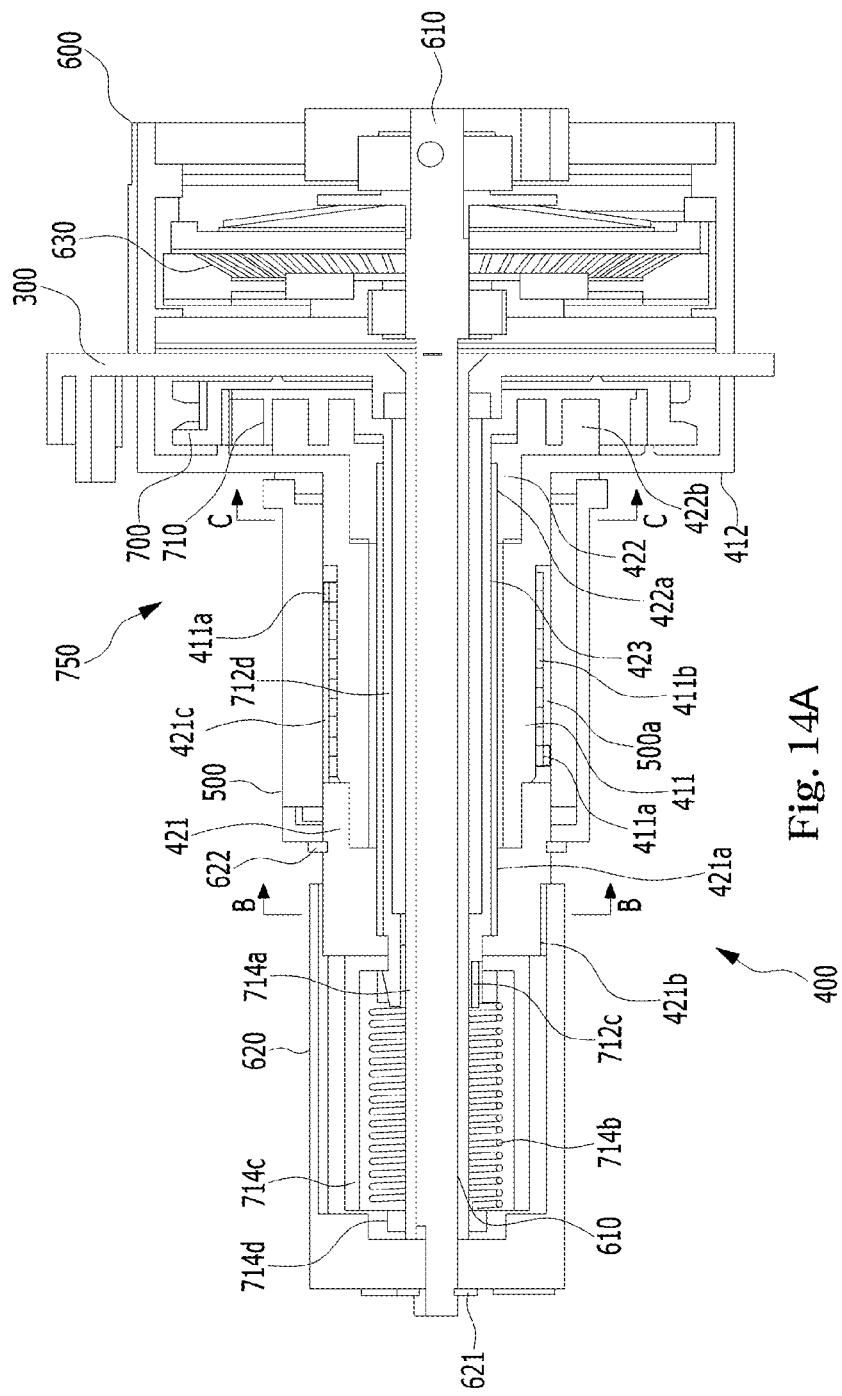
FIG. 14A is a cross-sectional view of a sunshade driving device having a return function of the wheel driving member of FIG. 13A.
Figure 14B:
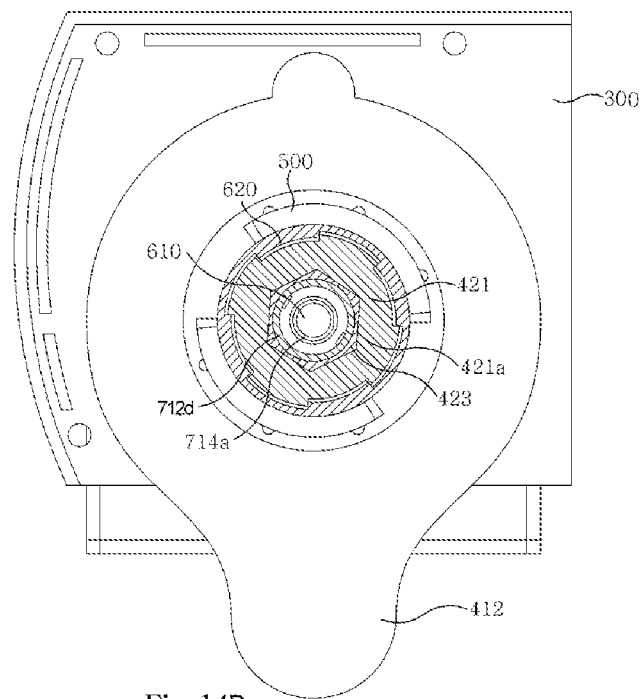
FIG. 14B is a cross-sectional view of a cutting line B-B of FIG. 14A.
Figure 14C:
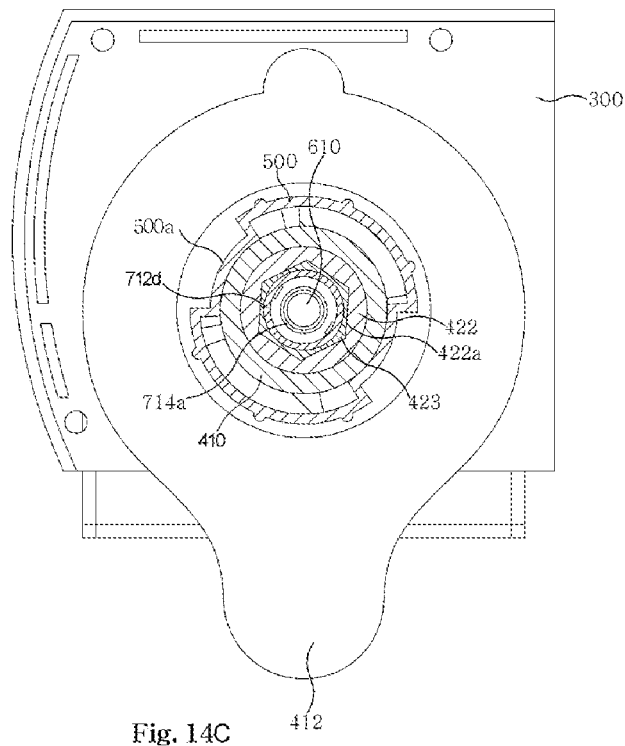
FIG. 14C is a cross-sectional view of a cutting line C-C of FIG. 14A.
Figure 15A:
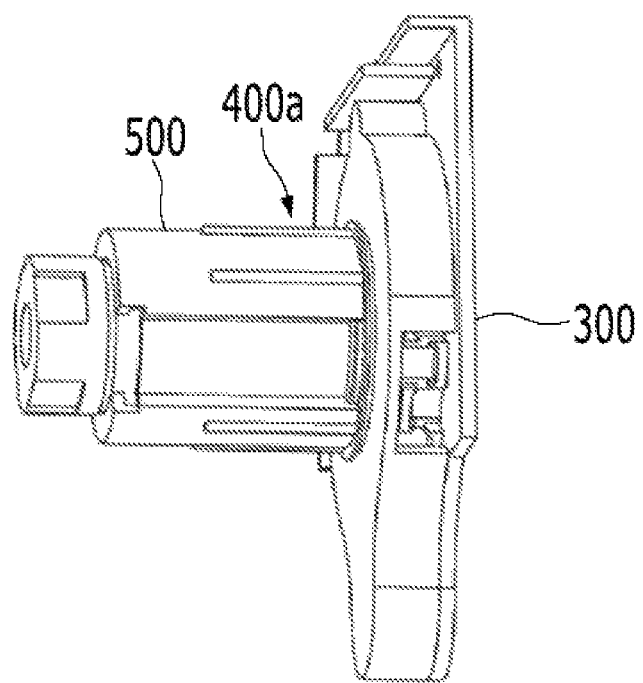
FIG. 15A is an example diagram of a manual/automatic combined driving module, which is a component of the sunshade driving device having a returning function of the wheel driving member according to the fourth embodiment of the present invention.
Figure 15B:
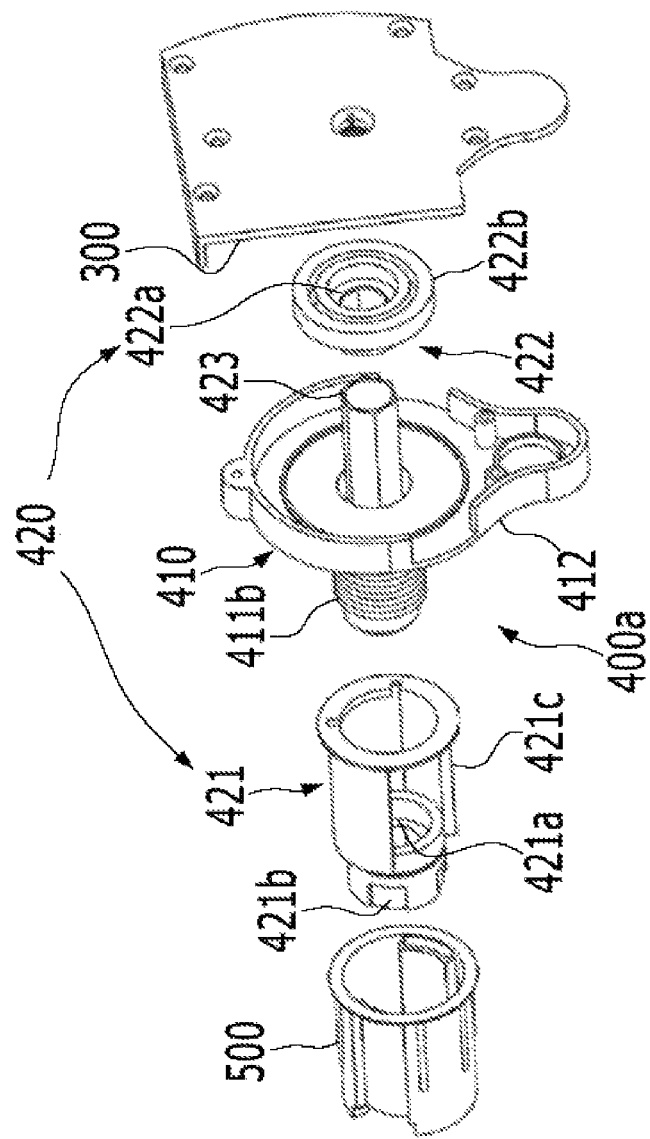
FIG. 15B is a partial exploded perspective view illustrating the manual/automatic combined driving module of FIG. 15A.
Figure 16:
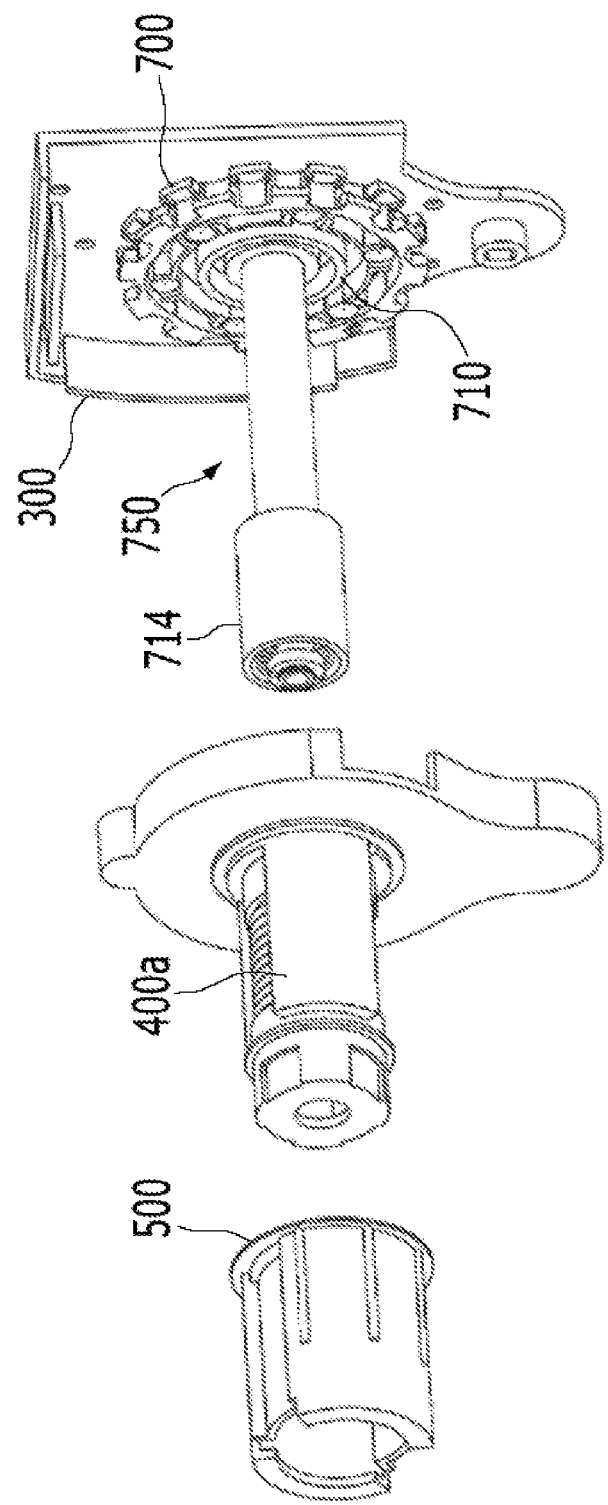
FIG. 16 is an exemplary diagram illustrating the assembly of manual/automatic combined driving module and a manual driver, which is a component of the sunshade driving device having a returning function of the wheel driving member according to the fourth embodiment of the present invention.
Figure 17:
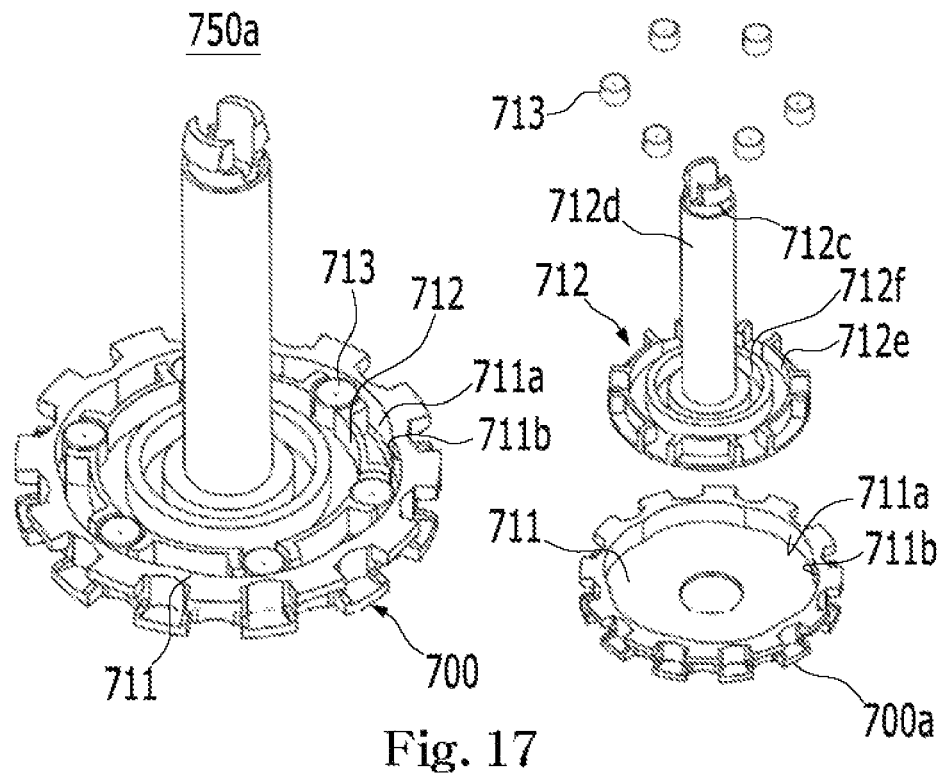
FIG. 17 is an example diagram of the bi-directional switching clutch member of the manual driver, which is one component of a returning function of the wheel driving member of the sunshade driving device according to the fourth embodiment of the present invention

FIG. 13A is a perspective view showing a sunshade driving device having a return function of the wheel driving member according to the fourth embodiment of the present invention; FIG. 13B is an exploded perspective view of the sunshade driving device of FIG. 13A; FIG. 14A is a cross-sectional view of a sunshade driving device having a return function of the wheel driving member of FIG. 13A; FIG. 14B is a cross-sectional view of a cutting line B-B of FIG. 14A; FIG. 14C is a cross-sectional view of a cutting line C-C of FIG. 14A; FIG. 15A is an example diagram of a manual/automatic combined driving module, which is a component of the sunshade driving device having a returning function of the wheel driving member according to the fourth embodiment of the present invention; FIG. 15B is a partial exploded perspective view illustrating the manual/automatic combined driving module of FIG. 15A; FIG. 16 is an exemplary diagram illustrating the assembly of manual/automatic combined driving module and a manual driver, which is a component of the sunshade driving device having a returning function of the wheel driving member according to the fourth embodiment of the present invention; FIG. 17 is an example diagram of the bi-directional switching clutch member, which is one component of the manual driver having a returning function of the wheel driving member of the sunshade driving device according to the fourth embodiment of the present invention.

As shown in FIG. 13A, FIG. 13B, FIG. 14A, FIG. 14B, FIG. 14C, FIG. 15A, FIG. 15B, FIG. 16 and FIG. 17, the sunshade driving device (400a) having a return function of the wheel driving member according to the fourth embodiment of the present invention is; the supporting case (300) formed a hole at a center with a predetermined diameter and integrally formed or fixed to the hollow (not shown) of the sunshade fixing bra-R at one end side; the manual/electric combined driving module (400) coupled to the supporting case (300) is for driving or stopping the sunshade by the ball chain (not shown) or the rotating string (not shown); the pick-up member (500), which is driving or driven by rotation of the sunshade rotating shaft (not shown), inserted to the outer peripheral surface of the manual/electric combined driving module (400), formed the recess protrusion (500a), and coupled to the sunshade rotating shaft (not shown); the manual driver (750), which is coupled to the manual/electric combined driving module (400) to provide the power by manual; an electric driving coupling member (620) is operated the manual/electric combined driving module (400) by the electric driving, and the rotational shaft (610) is included the electric driving module (600); it is included in the fourth embodiment of the present invention.

But, in some cases, the manual stopper (411), a spring member (411b), a wrap spring drive module (420) and the pick-up member (500) is consisted only without an electric driving module (600); also it is referred to the manual driving module (400a) driven by the manual driver (750).

accordingly, the manual/electric combined driving module (400) with respect to the fourth embodiment of the present invention is distinctly understood as the duplicated concept of the manual drive module (400a) and the electric driving module (600).

First of all, as shown in FIG. 14A to FIG. 15B, the manual/electric combined driving module (400) is disclosed in detail; it is formed a receiving opening portion at one side end; the body case (425) is fixedly coupled to the supporting case (300), and fixedly coupled or integrally formed at its center portion; the spring member (411b) formed the locking member (not shown) is provided and inserted into the outer peripheral surface; the manual stopper (411) is formed a center hollow hole with a predetermined diameter on inner peripheral surface to pass through; the manual stopper (411)

is provided to be fitted into inner surface; when it is rotated, the spring body of the spring member (411*b*) consisted of the manual stopper (411) pushes the locking protrusion (not shown) to release the friction force in the spring member (411*b*) by a releasing protrusion (421*c*); opened in the middle of the cylindrical hollow body, and formed at the both end portions, the manual stopper (411) is inserted into the one side end; on other end, the first wrap spring drive part (421) consisted of the inner surface mounting end (421*a*) and the outer surface mounting end (421*b*) is formed; the second wrap spring drive part (422) formed a driving sleeve (422*b*) on one end side of the outer peripheral surface; the inner peripheral surface coupling ends (421*a*, 422*a*) of the first and second wrap spring drive parts (421, 422) is inserted into the hollow hole of each manual stopper (411) to be faced, each other; the wrap spring drive module (420) provides the driving connector (423) formed the coupling protrusion on the outer peripheral surface with a predetermined length; in the fourth embodiment of the present invention, the driving connector (423) is fixedly inserted into both ends of the first wrap spring drive part (421) and the second wrap spring drive part (422) of the wrap spring drive module (420); the hexagonal-shape of the coupling protrusion formed on the outer peripheral surface is provided as a separate hollow rod having a predetermined length; accordingly, the wrap spring drive module (420) is consisted of the first and second wrap spring drive parts (421, 422) is assembled and coupled in the between place of the manual stopper (411) to be rotatable; this feature is obviously different with the prior art.

Particularly, when the conventional wheel driving unit (43, see FIG. 1) and the spring drive member (94, see FIG. 2) are used; it is required the proper supporting capacity of the manual stopper (411) having proper size of diameter to drive a large size of the screen sheet; the manual stopper (411) and the spring member (411*b*) is inserted when it is assembled; and this in view, the wheel driving unit (43, see FIG. 1) and the spring drive member (94, see FIG. 2), the outer diameter of the driving sleeve becomes very large state and it is difficult to reduce its size (described later); the bi-directional switch clutch member (710) and the manual driver (750) is necessarily becoming larger; considering the hollow shaft diameter of the sunshade driving device and the narrow installation site, this limitation is able to apply the small size of the sunshade only, and reversely forced to reduce the outer diameter of the manual stopper (411) and the spring member (411*b*); In addition, the bi-directional switching clutch member (710) (described later) and the manual driver (750) are installed in front of the manual stopper (411) only, the installation space of the reverse rotating unit (714) is limited to the inner space of the manual/electric combined driving module (400) (described later); there is a problem that it cannot be applied the proper size of the spring member (411*b*) for the various sizes and weights of the sunshade; therefore, the alternatives is suggested to solve the problem.

Accordingly, the manual/electric combined driving module (400) of the fourth embodiment of the present invention is possible to drive the wrap spring drive module (420) in the back of the module stopper (411) by the second wrap spring drive part (422) drawn out to the rear, through the driving connector (423); the diameter of the driving sleeve (422*b*) formed to the second wrap spring drive part (422) can be freely adjusted; the size of the bi-directional switching clutch member (710) (described later) and the manual driver (750) can be properly adjusted; unlike the conventional wheel driving unit (43, see FIG. 1) and the spring drive member (94, see FIG. 2), the electric driving module (600) as well as the manual pulley (700*a*) is driven together with the wrap spring drive module (420); in a combined state of the body case (425) of the module stopper (411) of the manual/electric combined driving module (400) and the support case (300) is installed to one side of the sunshade; the selected one of the first and second wrap spring drive part (421, 422) is connected to the selected one of the rotating shaft of the electric driving module (600) and the manual driver (750) (described later), it will be the manual operation only (the first wrap spring drive part (421)+the manual driver (750), and the electric operation only (the second wrap spring drive part (422)+the rotating shaft of the electric driving module (600); it will be combined manual and electric driving; however, only the electric module is operated the sunshade (the first wrap spring drive part (421)+the manual driver (750) and the second wrap spring drive part (422)+the rotational shaft (610) of the electric driving module (600); when the electric driving module (600) is out of order, it can be easily repaired; if the electric driving module (600) is included one more bidirectional switching clutch member (710, see FIG. 17) (described later), it is possible to freely operate the sunshade without mutual disturbance between the electric and the manual; in the first embodiment of the present invention, the electric driving module (600) is not added the bi-directional switching clutch member (750*a* see FIG. 17) (described later) to easily understand for a person skilled in the art; normally, the electric driving, which is not interfered with the manual driving is used; when the motor (630 piezo-motor is preferred) is out of order and the electric driving module (600) does not work, the motor will be separate to repair, then the sunshade is needed to operate in emergency by manual until the motor is completely repaired; after repaired, the motor is easily mounted back to the sunshade.

In addition, as shown in FIG. 13A and FIG. 14A of the fourth embodiment of the present invention, the electric coupling member (620) coupled the rotational shaft (610) of the electric driving module (600) has the manual/electric combined driving module (400) consisted of the wrap spring drive module (420) of the first wrap spring drive part (421) coupled the coupling end (421*b*), which is secured to prevent falling by the snap ring, on the outer peripheral surface.

In addition, as shown in FIG. 16 and FIG. 17, the manual driver (750) is included the manual pulley (700*a*) and the wrap spring drive module (420) consisting of the second wrap spring drive part (422) integrally formed with the U' shaped loop wheel driving member (not shown); the 'U' loop manual driver (not shown) or the wrap spring drive module (420) consisted of the second wrap spring drive part (422) is formed separately from the manual pulley (700*a*) and integrally formed the wheel driving member (700); the wheel driving member (700) integrally formed or inserted into the wrap spring drive module (420) consisted of the second wrap spring drive part (422) of the driving sleeve (422*b*), which is inserted to rotate in right side to left side by the friction force; the bidirectional switching clutch member (710) is released the frictional force; it comprises any one selected from the safety manual driver (750*a*); the fourth embodiment of the present invention is provided a safety manual driver (750*a*), which is configured of the bidirectional switching clutch member (710) having the bi-directional driver (711) on a circular arc shape forming a small diameter (711*a*) and the large diameter (711*b*) on the inner circumferential surface moving groove formed with a constant interval; the sleeve receiving portion (712*e*, 712*f*) on the body center of the disk-like and the unit elastic member holder (712*b*) formed curved arc-shape on each upper side; a sleeve receiving portion (712*e*) arranged with multi rows along the periphery with a constant interval is formed a coupling member (712*c*), which is undercut its one side of the upper surface and protruded to the front and a hollow having a cylindrical shape with a predetermined diameter and length for passing through; at the other end, the retainer (712) is fixedly combined to a guiding member (712*d*), which is integrally formed a disc-shaped body at the center; the bidirectional driver (711) has the roller member (713), which is inserted rotatable between the large-diameter (711*b*) of the bi-directional moving groove and the unit elastic member holder (712*b*) of the retainer (712); when the bidirectional driver (711) is rotated to left and right, it pushes the roller member (713) to roll left and right between the small diameter (417*j*) and the large diameter (417*k*) of the bi-directional moving grooves of the bidirectional driver (711) of arc-shape; as the roller member (713) is closer to the small diameter (711*a*), it is pressed and inserted by the small diameter (711*a*), the other end is pushed to the sleeve receiver (712*a*) of the retainer (712) to be protruded or to freely rotated in the position of the large-diameter (417*k*); as a result, the protruded other end is retreated or advanced to the sleeve receiver (712*e*) of the retainer (712); through this method, the second wrap spring drive part (422) of the wrap spring drive module (420) inserted to the sleeve receiver (712*e*) is tightly locking or releasing to the outer peripheral surface of the driving sleeve (422*b*) by the friction force; in the fourth embodiment of the present invention, the bidirectional drivers (711) is integrally formed to the wheel driving member (700); the roller member (713) is selected either one of the spherical ball or a cylindrical roller having a predetermined length and diameter; the cylindrical roller is provided in the fourth embodiment; each of the unit elastic member holder (712*b*) is further included a pair of the unit elastic member (not shown); at this time, the unit elastic member (not shown) is made of a magnet piece or a spring; when the retainer (712) is stopped to rotate, the unit elastic member (not shown) pushes each of the roller member (713) to left and right to set the neutral position i.e., the position of the large diameter (711*b*) of the bi-directional moving groove of the bidirectional driver (711); In the fourth embodiment of the present invention, the unit elastic member (not shown) does not include; beside of such a unit elastic member (not shown), the overall roller member (713) sets in the neutral position at once, by continuously rotating the entire retainer (712) or rotating opposite direction of the predetermined angle; the Republic of Korea Patent Registration No. 1997-0011290 and the Patent Registration No. 20-0260431 discloses the entire elastic member (not shown) and the unit elastic member (not shown); it does not included in the fourth embodiment of the present invention; the further detailed explanation is omitted here because it is known fact in the art; the reason is that the spring member (411*b*) of the manual stopper (411), which is a component of the manual driving module (400*a*) is acting the overall elastic member (not shown); a user release the ball chain (not shown) or the rotating string (not shown) to stop the manual operation, the spring member (411*b*), which was tightly narrowed by the body is returned to the original position by the elastic force; thus, the overall roller member (713) is elastic, at once.

On the other hand, the bi-directional switching clutch member (710) further includes a reverse-rotating unit (714) for reverse rotating the retainer (712) when the user release the chain ball (not shown) or the rotating string (not shown) to stop the manual operation; in the fourth embodiment of the present invention, the reverse-rotating unit (714) included in the bi-directional switching clutch member (710) is continuously rotating the overall retainer (712) in the reverse direction.

And, the reverse-rotating unit (714) is fixed to one side end of the supporting case (300) and formed a through hollow for drawn out the guiding member (712*d*) of the bi-directional switching clutch member (710); inside, the spring fixing rod (714*a*) formed the hollow to pass through the rotational shaft (610) of the electric driving module (600); the drawn out end of the spring fixing rod (714*a*) is fixed to one end of the holding unit (714*d*); the other end is fixed to the bi-directional switching clutch member (710), the engaging member (712*c*) of the guiding member (712*d*); the torsional spring (714*b*) as an elastic member for accumulating the resilient power according to the left and right rotation of the guiding member (712*d*) of the bi-directional switching clutch member (710); the spring cap member (714*c*) for surrounding the torsional spring (714*b*) as an elastic member is included.

Accordingly, the bi-directional switching clutch member (710) is driving on or off the second wrap spring drive part (422) of the wrap spring drive module (420) by tightly contact on or off the outer circumferential surface of the driving sleeve (422*b*) using the frictional force; at the same time, the rotational force is stored in the reverse driving unit (714); the user release the chain ball (not shown) or the rotating string (not shown) to stop pulling operation, the torsional spring (714*b*) as an elastic member is reversely rotated and rotating the bi-directional switching clutch member (710) and the guiding member (712*d*); sequentially, the overall roller member is elasticated, and the second wrap spring drive part (422) of the wrap spring drive module (420) released the frictional force in the driving sleeve (422*b*); the roller member (713) placed in the neutral position is idling; continuously, rotated the bidirectional driver (711) reversely; eventually, it rotates the manual pulley (700*a*) reversely, then the ball chain (not shown) or a rotating string (not shown) is drawn backward to return the ball chain (not shown) or a rotating string (not shown); instead of using the 'U' shape loop of the ball chain (not shown) or rotating string (not shown), it is possible to use a straight single line of the ball chain (not shown) or the rotating string (not shown) or a easily separated end of the ball chain (not shown) or the rotating string (not shown); it is also, useful to prevent the children's accident occurred by the 'U'-shaped loop of the ball chain (not shown) or the rotating string (not shown); the manual/electric combined driving module (400) is rotatable fixed through the protruded guiding member (712*d*) of the retainer (712); at the same time, the reverse rotating unit (714) guides the manual/electric combined driving module (400) to locate outside; it is possible to apply the proper size of the spring member (411*b*) of the reverse rotating unit (714); at the same time, the spring fixing shaft (714*a*) and the rotational shaft (610) of the motor (630) are able to pass through the inner hollow; further, it has a merit to be easily assembled.

on the other hand, the electric driving module (600) is included the encoder device (not shown) coupled to the pick-up member (500) for measuring the rotational speed and position of the sunshade rotating shaft (not shown); in the fourth embodiment of the present invention is adopted a piezoelectric motor (630); the rotational shaft (610) of the motor is passed through the spring fixing shaft (714*a*), which is a configuration of the reverse rotating unit (714) to be coupled to the electric coupling member (620); it can be easy to understand for those skilled in the art; thus, the detailed description will be omitted in the fourth embodiment of the present invention.

the numeral reference (621) is a snap ring; the numeral reference (712*c*) is an engaging protrusion of the spring, and the numeral reference (421*c*) is the locking release protrusion.

hereinafter, the operation of the sunshade driving device (400*a*) having a return function of the wheel driving member according to the fourth embodiment of the present invention is explained; first, applying the electricity to the piezoelectric motor; the rotational shaft (610) is rotated to left and right, the coupled electric coupling member (620), the wrap spring drive module (420) of the manual/electric combined driving module (400), the first wrap spring driving part (421) is rotated; the spring body of the spring member (411*b*) consisted of the manual stopper (411) is pushed the engaging protrusion (not shown) in the opening direction to release the friction of the spring member (411*b*); at the same time, by rotating the coupled pick-up member (500), the sunshade is winding or unwinding; at this time, the bi-directional switching clutch member (710) releases the driving sleeve (422*b*) of the second wrap spring drive part (422) of the wrap spring drive module (420) by the reverse rotating unit (714); it does not affect the manual driver (750) mounted the ball chain (not shown) or the rotating string (not shown) as driving of the conventional electric sunshade; when the motor is out of order, the rotational shaft (610) and the electric coupling member (620) are disassembled to repair; if the motor is removed to repair for emergency response (not shown), a user rotates the manual pulley (700*a*) through the ball chain (not shown) or the rotating string (not shown); the wheel driving member (700), the bi-directional switching clutch member (710), the second wrap spring drive part (422) of the wrap spring drive module (420), the driving sleeve (422*b*), the pick-up member (500), the rotating shaft of the sunshade (not shown) the driving force is transmitted to manually operate the sunshade device; when the user release the ball chain (not shown) or the rotating string (not shown) to stop the manual operation, the rotational force by the weight of the sunshade is rotated the pick-up member (500) through the sunshade rotating shaft (not shown); the spring body of the spring member (411*b*) consisting of the manual stopper (411) is pushed to the direction to be narrowed for increasing the frictional force to stop the sunshade operation; at the same time, the ball chain (not shown) or the rotating string (not shown) is returned by the reverse rotating unit (714).

additionally, rather than including a reverse rotating unit (714), as a modified example of the fourth embodiment of the present invention, the 'U' shaped loop ball chain (not shown) or the rotating string (not shown) is used, but the length is shortened and it can be configured; another variation is possibly modified the present invention like that the manual pulley (700*a*) of a manual driver (750) is directly coupled to the rotational shaft (610) of the motor.

such the present invention has an effect to respond easily repair or complaints of the customer for the sunshade driving device (400*a*) having a return function of the wheel driving member according to the fourth embodiment of the present invention.

further, it is possible that the retainer (712) is directly connected to the main body of the torsion spring (714*b*) as an elastic member, without the guiding member (712*d*).

Fifth Embodiment

Figure 18:
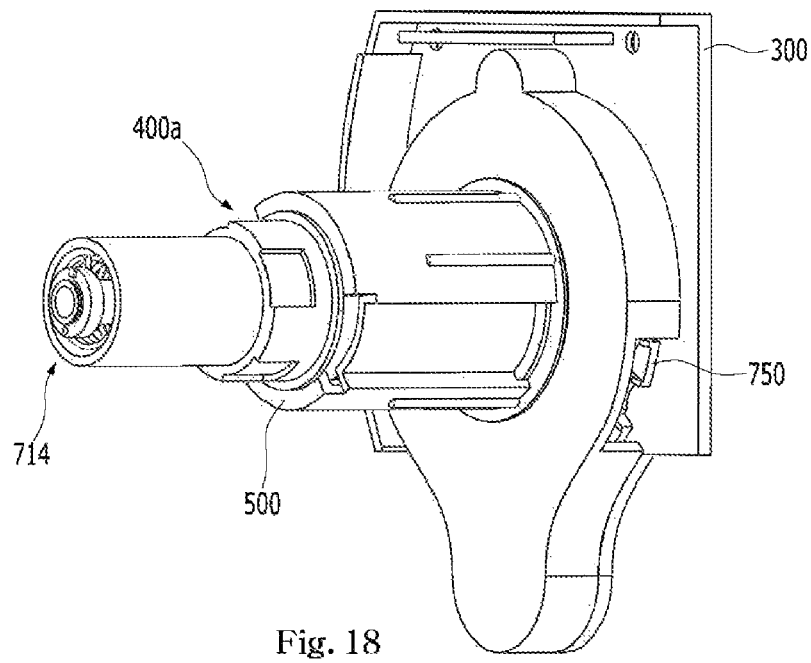
FIG. 18 is a perspective view illustrating the sunshade driving device having a reduced function for manual driving only of returning function of the wheel driving member for manual only according to the fifth embodiment of the present invention.
Figure 19:
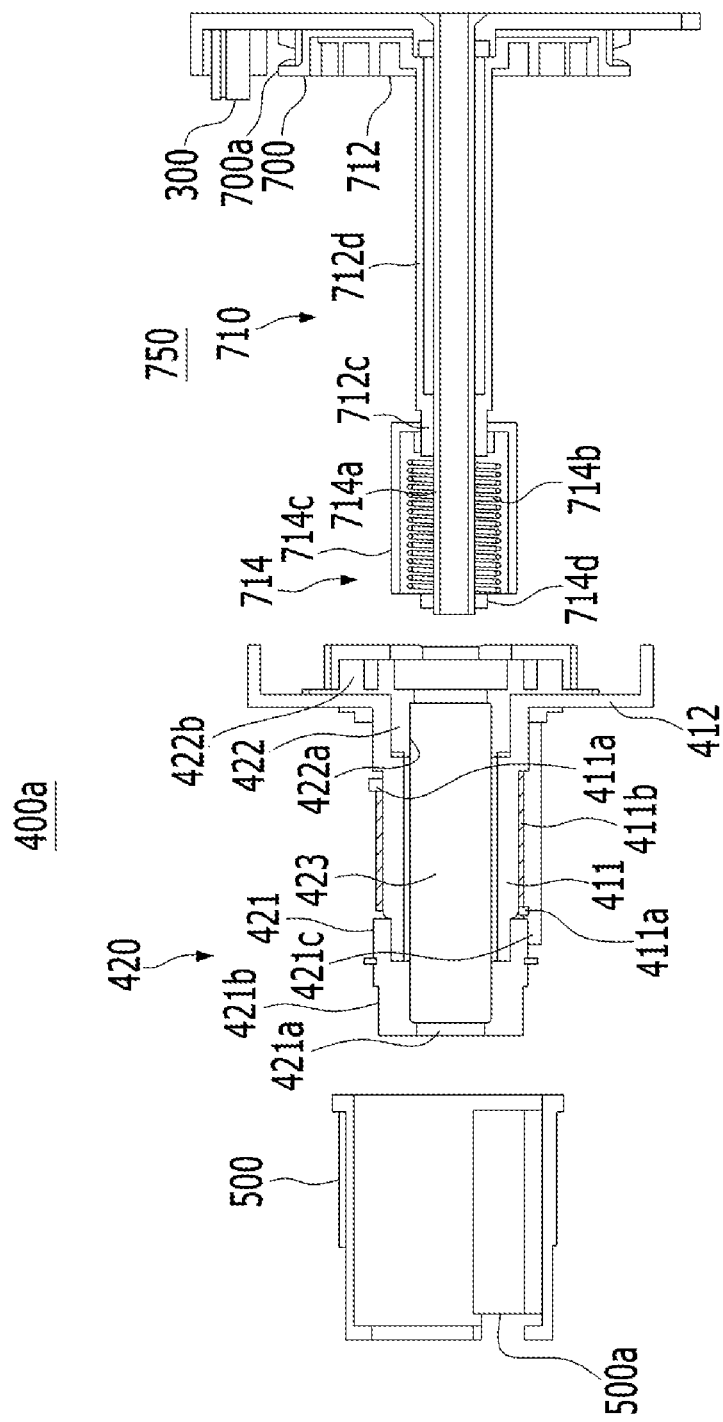
FIG. 19 is an exploded cross-sectional view of FIG. 18.

FIG. 18 is a perspective view illustrating the sunshade driving device having a reduced function for manual driving only of the returning function of the wheel driving member according to the fifth embodiment of the present invention, FIG. 19 is an exploded cross-sectional view of FIG. 18.

As shown in FIG. 18, and FIG. 19, the sunshade driving device (400*b*) having a return function of the wheel driving member according to the fifth embodiment of the present invention, unlike the return function of the wheel driving member according to the fourth embodiment of the present invention; it is only the example of the manual operating without the electric driving module (600); and for illustrating the flexibility with respect to those of ordinary skill in the art; it is easy to combine the manual/electric combined operation and the manual operation alone of the present invention; in addition, the composition and the operation is same as the fourth embodiment of the present invention; so, the detailed description will be omitted.

although it is not shown as another modification of the fifth embodiment of the present invention; the bi-directional switching clutch member (710) is moved to a position of the first wrap spring driving part (421) of the wrap spring drive module (420) of the manual/electric combined driving module (400); the bidirectional driver (711) is coupled to the electric coupling member (620) consisting of the electric driving module (600); the hollow shaft (not shown) is connecting the wheel driving member (700) of the manual driver (750) and the electric coupling member (620) for passing through the guiding member (712*d*) of the bi-directional switching clutch member (710); it is easy to make the various modification for the person skilled in the art; thus, further description will be omitted.

Thus, the present invention can be used the manual/electric combined when a motor is added; or if motor is not included, it is possible to use manual only applied the gear ratio; it is also possible to reduce the function to be used manual only, and it has a big effect application and there may be various modifications.

Thus, it should not be interpreted that the embodiments of the present invention is limited to the scope of above descriptions. The scope of the present invention is limited only by the matters described in the claims, one of ordinary skill in the art, it is possible to change the scope of the present invention improved in various forms. Therefore, these modifications and changes will belong to the protection scope of the present invention will be apparent to those of ordinary skill.

What is claimed is:

1. A sunshade driving device having a returning function of a driving wheel unit consisted of either one of a manual pulley (417*a*) or a manual driving wheel (412*b*) comprising:
  a manual driving module (410) actuated by a ball chain or a rotating string,
  a set of pick-up member driven by the manual driving module for directly driving a sunshade rotating shaft (23),
  a wheel driving member (417) having a driving wheel element for mounting the ball chain or the rotating string, and
  a bi-directional driving clutch (417*b*) for transmitting or releasing a rotational force of the driving wheel member in any one of both directions,
  when the bi-directional driving clutch (417*b*) properly drives the driving wheel member in either one of clockwise or counter-clockwise directions, the bi-directional driving clutch (417*b*) is configured to bind the driving wheel member and the manual driving module (410) to rotate together with the pick-up member; and immediately after rotation, when the bi-directional driving clutch (417b) allows to reverse-rotate the driving wheel member in the opposite direction, the bi-directional driving clutch (417b) is configured to unbind the driving wheel member and the manual driving module (410) to rotate independently from the pick-up member, said bi-directional driving clutch (417b) further comprising: a bi-directional driver (417e) being coupled to the driving wheel member and having a body (417i) in an inner circumferential surface forms a plurality of bi-directional moving grooves arranged with a constant interval, and each of the bi-directional moving grooves forms an arc-shape having a small diameter (417j) and a large diameter (417k);

a retainer (417g) having a disk-shaped body, a plurality of unit elastic member holders (417m) arranged along with its periphery with a constant interval on a plane of the disk-shaped body, and a plurality of roller members (417f) inserted rotatable between the bi-directional moving grooves of the bi-directional driver (417e) and the unit elastic member holders (417m) of the retainer (417g), respectively.

2. The sunshade driving device according to claim 1, the bi-directional driving clutch (417b) further comprising:

a reverse rotating unit (417d) to reverse a retainer (417g) of the bi-directional driving clutch (417b), when an operator releases the ball chain or the rotating string and stops the manual rotating operation.

3. The sunshade driving device according to claim 1, further comprising:

a rotating shaft (491) being attachable/detachable to a shaft rotation stopping unit or a power driving unit separated from the manual driving module, a planetary gear train (430) consisted of three gear elements of a ring gear (432), a sun gear (434) and a planetary gear carrier (431), whose a first gear element is coupled to an output of the manual driving module (410), and whose a second gear element is coupled to the rotating shaft (491), and a second pick-up member (452) for driving the sunshade rotating shaft and for coupling to the third gear element of the three gear elements.

4. The sunshade driving device according to claim 3, the planetary gear train (430) consisted of:

a first planetary gear carrier (431a), the ring gear (432), a free gear (433), a second planetary gear carrier (431b) being connected to the first planetary gear carrier (431a) and a shaft (433s) of the free gear, and the sun gear (434) having a predetermined length and forming a gear teeth with a predetermined width on an end side; and said sunshade driving device further comprising a third pick-up member (453) being shaft-coupled to the second planetary gear carrier (431b) for driving the sunshade rotating shaft along with the second pick-up member (452).

5. The sunshade driving device according to claim 3, further comprising:

a stopping unit for stopping the rotating shaft (491), wherein a gear ratio of the first gear element and the third gear element of the three gear elements is 1:n (n>1).

6. The sunshade driving device according to claim 3, further comprising:

an electric driving module (490) for driving the rotating shaft (491), wherein the sunshade rotating shaft is driven by the manual driving module through the planetary gear train, when the electric driving module is not in operating state; and the sunshade rotating shaft is driven by the electric driving module (490) through the planetary gear train when the electric driving module (490) is in operating state.

7. The sunshade driving device according to claim 1, the manual driving module (410) further comprised of:

a manual stopper (411) firmly fixed to a fixing bracket, a wrap spring drive member (412) having a lock releasing protrusion (412a), which is inserted into a manual driver (414) having an inner protrusion (414c);

wherein, on both end portions of the spring member (411b), locking portions (411a) are formed and a spring member (411b) is wrapped around the outer peripheral surface of the manual stopper (411);

the lock releasing protrusions (412a) releases the frictional force of the spring member (411b) by pushing the locking portion (411a) in the direction of opening a body of the spring member, when the ball chain or the rotating string is pulled, the inner protrusion (414c) increases the frictional force of the spring member (411b) by pushing the locking portion (411a) of the spring member (411b) composed the manual stopper (411) in the direction to narrow the body of the spring member, when the manual driver (414) is rotating by the weight of the sunshade, the inner protrusion (414c) is pushed by rotating with the lock releasing protrusion (412a), when the wrap spring drive member (412) is rotating; and the manual driving module (410) is inserted freely rotatable to the inside of a first pick-up member coupled to the sunshade rotating shaft.

8. The sunshade driving device according to claim 7, the manual stopper (411) having a hollow (411c) with a predetermined diameter, further comprising:

the hollow (411c) is formed as the inner circumferential surface of the manual stopper (411), and a protrusion of the fixing bracket is inserted through the hollow (411c) and therefore the manual stopper (411) is firmly coupled to the fixing bracket, and the manual stopper (411) is inserted into the wrap spring drive member (412).

9. A sunshade driving device having a returning function of a driving wheel unit consisted of either one of a manual pulley (417a) or a manual driving wheel (412b) comprising:

a manual driving module (410) actuated by a ball chain or a rotating string, a set of pick-up member driven by the manual driving module for directly driving a sunshade rotating shaft, a wheel driving member (417) having the a driving wheel element for mounting the ball chain or the rotating string, a bi-directional driving clutch (417b) for transmitting or releasing a rotational force of the driving wheel member in any one of both directions, when the bi-directional driving clutch (417b) properly drives the driving wheel member in either one of clockwise or counter-clockwise directions, the bi-directional driving clutch (417b) is configured to bind the driving wheel member and the manual driving module (410) to rotate together with the pick-up member; and immediately after the rotation, when the bi-directional driving clutch (417b) allows to reverse-rotate the driving wheel member in the opposite direction, the bi-directional driving clutch (417b) is configured to unbind the driving wheel member and the manual driving module (410) to rotate independently from the pick-up member, the bi-directional driving clutch (417b) further comprising of a reverse rotating unit (417d) to reverse a retainer (417g) of the bi-directional driving clutch (417b), when an operator releases the ball chain or the rotating string and stops the manual rotating operation, the reverse rotating unit (417d) further comprising:
a spring (417t),
a fixing pin (417v) fixedly coupled to a fixing end (416d) of a cap member (413),
a spring bobbin (417u) formed a cylindrical shape, which has a containing groove with a preset depth for receiving a spring (417t) on one end of inner circumferential surface and a rope coupler on the opposite end of an outer peripheral surface, and
a returning rope (417w), of which the one end is coupled to the rope coupler of the spring bobbin (417u); and of which the opposite end is coupled to the rope coupler (417n) of the retainer (417g) of the bi-directional driving clutch (417b).

10. A sunshade driving device having a returning functions of a driving wheel member, comprising:
a manual driving module (400a) actuated by a ball chain or a rotation string,
a pick-up member for driving a sunshade rotating shaft by the manual driving module (400a),
a wheel driving member (700) having a manual pulley (700a) for mounting the ball chain or the rotating string,
a bi-directional switching clutch member (710) for transmitting or releasing a rotational force of the manual pulley in any one of both directions,
wherein, the manual driving module (400a) is started to drive by the rotation of the manual pulley (700a); the rotation of the manual driving module (400a) is stopped by the weight of the sunshade, when the manual pulley (700a) stops driving; and
when the bi-directional switching clutch member (710) properly drives the manual pulley in any one of both directions, the bi-directional switching clutch member (710) is configured to bind the manual pulley and the manual driving module (400a) to rotate together with the pick-up member (500); and immediately after the rotation, when the bi-directional switching clutch member (710) allows to reverse-rotate the manual pulley in the opposite direction, the bi-directional switching clutch member (710) is configured to unbind the manual pulley and the manual driving module (400a) to rotate independently from the pick-up member (500),
the bi-directional switching clutch member (710) further comprising:
a bi-directional driver (711) being coupled to the manual pulley (700a) and having a body in an inner circumferential surface where a plurality of bi-directional moving grooves arranged with a constant interval, and each of the bi-directional moving grooves formed an arc-shape having a small diameter (711a) and a large diameter (711b);
a retainer (712) having an engaging part (712a) coupled to one end of the an elastic member, and a plurality of the unit elastic member holders (712b) arranged with a constant interval; and
a plurality of roller members (713) inserted rotatable between the bi-directional moving grooves of the bi-directional driver (711) and the unit elastic member holders (712b) of the retainer (712), respectively.

11. The sunshade driving device according to claim 10, the bi-directional switching clutch member (710) further comprising:
a reverse rotating unit (714) for reverse-rotating the retainer (712) of the bi-directional switching clutch member (710), when an operator releases the ball chain or the rotating string and stops the manual rotating operation.

12. The sunshade driving device according to claim 10, further comprising:
an engaging part (712c) is spaced apart from a position of the unit elastic member holder (712b) corresponding to a main body of the retainer (712), and the engaging part (712c) is coupled to a guide member (712d) of the main body of the retainer (712).

13. The sunshade driving device according to claim 10, further comprising:
an electric driving module (600), wherein the manual driving module (400a) is a manual/electric combined driving module (400).

14. The sunshade driving device according to claim 13, further comprising:
a hollow is formed at the center of a guide member (712d) wherein the rotating shaft (610) of the electric driving module (600) is passed through the inside of the hollow.

15. The sunshade driving device according to claim 10, the manual driving module (400a) further comprised of:
a manual stopper (411) firmly fixed to a fixing bracket,
a first wrap spring drive part (421) of a wrap spring drive module (420) having a locking release protrusion (421c), and
the pick-up member (500) having an inner locking protrusion (500a);
wherein, on both end portions of a spring member (411b), locking portions (411a) are formed and the spring member (411b) is wrapped around the outer peripheral surface of the manual stopper (411);
the lock releasing protrusions (421c) releases the frictional force of the spring member (411b) by pushing a locking portion (411a) in the direction of opening the body of the spring member, when the ball chain or the rotating string is pulled,
the inner locking protrusion (500a) increases a frictional force of the spring member (411b) by pushing the locking portion (411a) of the spring member (411b) composed the manual stopper (411) in the direction to narrow the body of the spring member, when the pick-up member (500) is rotating by the weight of the sunshade, and
the inner locking protrusion (500a) is pushed by and rotated with the locking release protrusion (421c), when the first wrap spring drive part (421) is rotated; and
the manual driving module (400a) is inserted freely rotatable to inside of the pick-up member (500) coupled to the sunshade rotating shaft.

16. The sunshade driving device according to claim 15, the bi-directional switching clutch member (710), further comprising:
a bi-directional driver (711) is formed on an electric coupling member (620) consisted of an electric driving module (600), and
a hollow shaft connecting the wheel driving member (700) of a manual driver (750) and the electric coupling member (620) is passed through a guiding member (712*d*) of the bidirectional switching clutch member (710).

17. The sunshade driving device according to claim 15, the wrap spring drive module (420) further comprises:
- the first wrap spring drive part (421) for directly driving the spring member (411*b*) of the manual driving module (400*a*) and a second wrap spring drive part (422) connected to the bi-directional switching clutch member (710), and
- a drive connector (423) for connecting the first wrap spring drive part (421) and the second wrap spring drive part (422),
- wherein a hollow having a predetermined diameter is formed by the inner peripheral surface of the manual stopper (411), which the driving connector (423) is passing through, and the manual stopper (411) is to be inserted into the first wrap spring drive part (421).

18. A sunshade driving device having a returning function of a driving wheel member, comprising:
- a manual driving module (400*a*) actuated by a ball chain or a rotation string,
- a pick-up member (500) for driving a sunshade rotating shaft by the manual driving module (400*a*),
- a wheel driving member (700) having a manual pulley (700*a*) for mounting the ball chain or the rotating string,
- a bi-directional switching clutch member (710) for transmitting or releasing a rotational force of the manual pulley in any one of both directions, wherein, the manual driving module (400*a*) is started to drive by the rotation of the manual pulley (700*a*); the rotation of the manual driving module (400*a*) is stopped by the weight of the sunshade, when the manual pulley (700*a*) stops driving; and when the bi-directional switching clutch member (710) properly drives the manual pulley in any one of both directions, the bi-directional switching clutch member (710) is configured to bind the manual pulley and the manual driving module (400*a*) to rotate together with the pick-up member (500); and immediately after the rotation, when the bi-directional switching clutch member (710) allows to reverse-rotate the manual pulley in the opposite direction, the bi-directional switching clutch member (710) is configured to unbind the manual pulley and the manual driving module (400*a*) to rotate independently from the pick-up member (500), the bi-directional switching clutch member (710) further comprising of a reverse rotating unit (714) for reverse-rotating a retainer (712) of the bi-directional switching clutch member (710), when an operator releases the ball chain or the rotating string and stops the manual rotating operation, the reverse rotating unit (714) further comprising:
a torsional spring (714*b*),
a fixing member (714*d*) for fixing one end of the torsional spring (714*b*) to a fixing rod (714*a*), and
a transmitting unit for transmitting the torsional force to the other end of the torsional spring (714*b*) when the manual driving module (400*a*) is operated.

* * * * *